US012169055B2

(12) United States Patent
Fannin et al.

(10) Patent No.: US 12,169,055 B2
(45) Date of Patent: Dec. 17, 2024

(54) LED LUMINAIRE WITH IMPROVED UPDATING AND REPLACEMENT CHARACTERISTICS

(71) Applicants: Wes Fannin, Greenvile, WI (US); Donald Verkuylen, Key Largo, FL (US)

(72) Inventors: Wes Fannin, Greenvile, WI (US); Donald Verkuylen, Key Largo, FL (US)

( * ) Notice: Subject to any disclaimer, the term of this patent is extended or adjusted under 35 U.S.C. 154(b) by 0 days.

(21) Appl. No.: 18/374,572

(22) Filed: Sep. 28, 2023

(65) Prior Publication Data

US 2024/0318809 A1 Sep. 26, 2024

Related U.S. Application Data

(60) Provisional application No. 63/469,341, filed on May 26, 2023, provisional application No. 63/466,162, filed on May 12, 2023, provisional application No. 63/459,504, filed on Apr. 14, 2023, provisional application No. 63/453,650, filed on Mar. 21, 2023.

(51) Int. Cl.

| | |
|---|---|
| ***F21V 19/00*** | (2006.01) |
| ***F21V 23/00*** | (2015.01) |
| ***F21Y 115/10*** | (2016.01) |

(52) U.S. Cl.

CPC ........ *F21V 19/0035* (2013.01); *F21V 23/005* (2013.01); *F21Y 2115/10* (2016.08)

(58) Field of Classification Search

CPC ........................... F21V 19/0035; F21V 23/005

See application file for complete search history.

(56) References Cited

U.S. PATENT DOCUMENTS 5,136,493 A * 8/1992 Straus ..................... F21V 29/15 362/373
6,464,378 B1 10/2002 Reed et al.
6,739,734 B1 5/2004 Hulgan (Continued)

FOREIGN PATENT DOCUMENTS

EP 1298383 B1 4/2003
WO WO2006082537 A1 8/2006

(Continued)

OTHER PUBLICATIONS

EvoKit Click 2x4, https://www.usa.lighting.philips.com/prof/indoor-luminaires/retrofit/evokit-click-2x4/LP_CF_8733568_EU/family.

(Continued)

*Primary Examiner* — Bryon T Gyllstrom
(74) *Attorney, Agent, or Firm* — Jeffrey Dean Lindsay

(57) ABSTRACT

An LED luminaire is described that can be readily installed, removed, or replaced. The LED luminaire may be modular with an easily removable component chassis having components such as sensors, LED driver elements, and so forth that may be modular. The LED luminaire is adapted for rapid access to the component chassis and rapid adjustment, updating, repairs, or replacement thereof. In one aspect, one or more first engaging elements form a connection between the component chassis and the frame that can support the frame in either a closed or open position, or allow for rotation of the frame from one orientation to another while still securing the component chassis to the frame.

20 Claims, 8 Drawing Sheets

(56) References Cited

U.S. PATENT DOCUMENTS

| | | | | |
|---|---|---|---|---|
| 7,080,923 | B2 * | 7/2006 | Plunk | F21S 8/031 362/225 |
| 7,314,295 | B2 * | 1/2008 | Legat | F21V 23/06 362/365 |
| 7,922,351 | B2 * | 4/2011 | Welker | F21S 8/02 362/147 |
| 8,100,551 | B2 * | 1/2012 | Mayfield, III | F21V 23/026 362/225 |
| 8,113,687 | B2 | 2/2012 | Villard et al. | |
| 8,319,437 | B2 | 11/2012 | Carlin | |
| 8,646,948 | B1 | 2/2014 | Reo et al. | |
| 8,696,158 | B2 | 4/2014 | Santiago et al. | |
| 8,727,566 | B1 | 5/2014 | Szeto | |
| 8,803,426 | B2 | 8/2014 | Carlin et al. | |
| 8,864,347 | B2 | 10/2014 | Pearson | |
| 8,956,013 | B1 | 2/2015 | Shew | |
| 8,960,958 | B1 * | 2/2015 | Hsia | F21S 8/00 362/217.05 |
| 9,016,892 | B1 | 4/2015 | Scribante et al. | |
| 9,072,135 | B2 | 6/2015 | Chakravarty | |
| 9,169,977 | B2 * | 10/2015 | Medendorp, Jr. | F21K 9/60 |
| 9,182,091 | B2 | 11/2015 | Gershaw | |
| 9,206,948 | B1 * | 12/2015 | Scribante | H05B 47/11 |
| 9,239,156 | B2 | 1/2016 | Wang | |
| 9,279,553 | B1 | 3/2016 | Scribante et al. | |
| 9,285,085 | B2 | 3/2016 | Carney | |
| 9,291,316 | B2 * | 3/2016 | Dixon | F21L 4/00 |
| 9,291,331 | B2 | 3/2016 | Keng | |
| 9,297,506 | B2 | 3/2016 | Magnan | |
| 9,322,518 | B1 * | 4/2016 | Steedly | F21S 8/026 |
| 9,353,923 | B2 | 5/2016 | Scribante et al. | |
| 9,488,348 | B2 | 5/2016 | Scribante et al. | |
| 9,541,270 | B2 | 1/2017 | Van Winkle | |
| 9,719,636 | B2 | 8/2017 | Engelhardt | |
| 9,759,418 | B2 | 9/2017 | Nolan et al. | |
| 9,964,289 | B2 | 5/2018 | Pearson | |
| 10,006,592 | B2 | 6/2018 | Carney et al. | |
| 10,161,578 | B2 | 12/2018 | Ham | |
| 10,184,648 | B2 | 1/2019 | Hall | |
| 10,228,097 | B2 | 3/2019 | Snijkers | |
| 10,288,240 | B2 | 5/2019 | Szeto et al. | |
| 10,309,627 | B2 | 6/2019 | Heeter et al. | |
| 10,352,544 | B2 | 7/2019 | Myers | |
| 10,422,518 | B2 | 9/2019 | Myers et al. | |
| 10,506,678 | B2 | 12/2019 | Harris | |
| 10,731,803 | B2 | 8/2020 | Van Winkle | |
| 10,941,908 | B2 | 3/2021 | May | |
| 10,948,133 | B2 | 3/2021 | Mcmillan | |
| 10,948,136 | B2 | 3/2021 | May | |
| 11,067,235 | B2 | 7/2021 | Mellor | |
| 11,293,609 | B2 | 4/2022 | Danesh et al. | |
| 11,353,178 | B2 | 6/2022 | Reich | |
| 11,378,262 | B2 * | 7/2022 | Koch | F21V 21/005 |
| 11,466,820 | B2 | 10/2022 | Secretin | |
| 2003/0011538 | A1 | 1/2003 | Lys et al. | |
| 2007/0070633 | A1 | 3/2007 | Eynden | |
| 2010/0289428 | A1 | 11/2010 | Colip | |
| 2011/0115381 | A1 | 5/2011 | Carlin | |
| 2011/0279063 | A1 | 11/2011 | Wang et al. | |
| 2012/0068604 | A1 | 3/2012 | Hasnain et al. | |
| 2012/0169507 | A1 | 7/2012 | Dyer | |
| 2013/0135875 | A1 | 5/2013 | Schutte et al. | |
| 2013/0294059 | A1 | 11/2013 | Galluccio et al. | |
| 2014/0177209 | A1 | 6/2014 | Carney et al. | |
| 2014/0268828 | A1 | 9/2014 | Bailey | |
| 2014/0301074 | A1 | 10/2014 | Miskin | |
| 2014/0313780 | A1 | 10/2014 | Myer | |
| 2014/0340884 | A1 | 11/2014 | Hsia | |
| 2015/0036387 | A1 | 2/2015 | Myers | |
| 2016/0033088 | A1 * | 2/2016 | Mayfield, III | F21S 8/046 362/225 |
| 2016/0195225 | A1 | 7/2016 | Carney et al. | |
| 2017/0328544 | A1 | 11/2017 | Gergely et al. | |
| 2018/0180233 | A1 | 6/2018 | Mellor | |
| 2018/0274734 | A1 | 9/2018 | Cerce et al. | |
| 2019/0032859 | A1 * | 1/2019 | Novak | F21K 9/278 |
| 2019/0124734 | A1 | 5/2019 | Rodriguez | |

FOREIGN PATENT DOCUMENTS

| | | | |
|---|---|---|---|
| WO | WO2015024844 | A1 | 2/2015 |
| WO | WO2016133493 | A1 | 2/2015 |
| WO | WO2016202714 | A1 | 12/2016 |
| WO | WO2017004064 | A1 | 1/2017 |

OTHER PUBLICATIONS

Video-Document-V-1.pdf, "YouTube Video on Philips EvoKit Click," YouTube, Jan. 10, 2019, transcript and screenshots of the video at https://www.youtube.com/watch?v=rS_nOILGES8, printed in PDF format.

"Philips Installation guide, Philips EvoKit Click LED 2x2—2x4—1x4 Standard and SR," https://www.assets.signify.com/is/content/Signify/Assets/philips-lighting/united-states/20211129-installation-guide-evokit-click.pdf.

"LED Troffer Features a Replaceable Light Engine," RetroFit Magaine, Jun. 30, 2016, https://retrofitmagazine.com/led-troffer-features-replaceable-light-engine/.

Video-Document-V-2.pdf, Orion Energy Systems Video, "Harris LED LDR® Troffer Retrofit, Gen 3 | LDRE3," no date visible, https://www.orionlighting.com/products/indoor-led-lighting/ldre3, viewed Nov. 9, 2023, printed in PDF format.

* cited by examiner

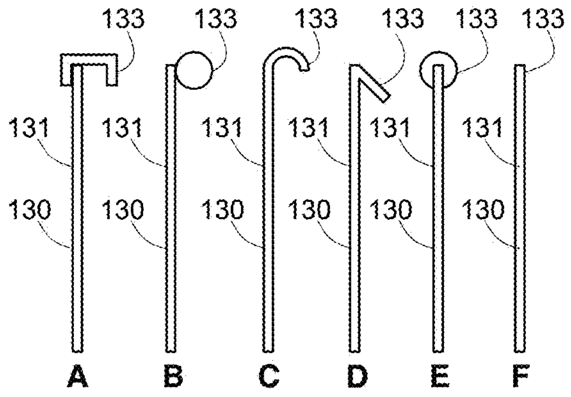
Figs. 9A-F
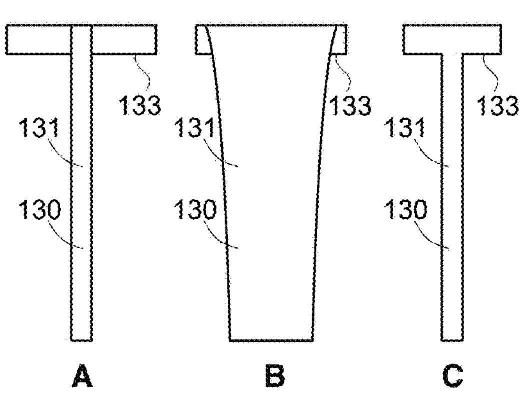
Figs. 10A-C
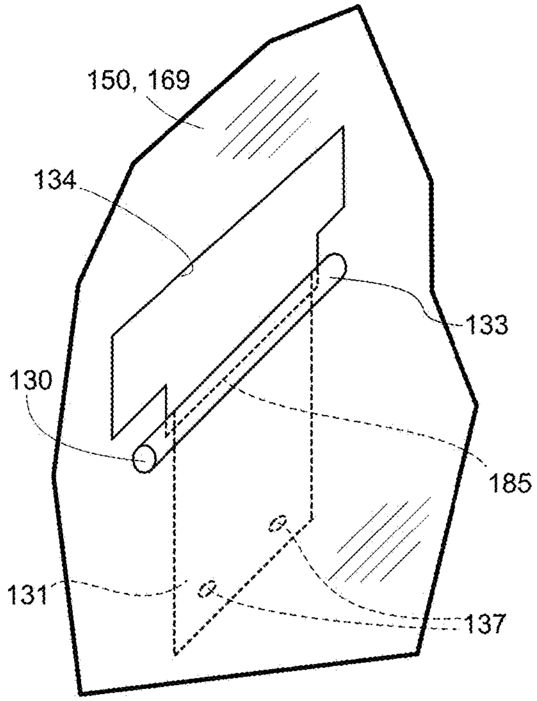
Fig. 11

LED LUMINAIRE WITH IMPROVED UPDATING AND REPLACEMENT CHARACTERISTICS

CROSS-REFERENCE TO RELATED APPLICATIONS

This application claims priority to U.S. Provisional Patent Application Ser. No. 63/459,504, "LED Luminaires for Safety Systems," filed Apr. 14, 2023; U.S. Provisional Patent Application Ser. No. 63/453,650, "LED Luminaire Replacement and Retrofit Units," filed Mar. 21, 2023; 63/469,341; U.S. Provisional Patent Application Ser. No. 63/466,162, "Universal LED Drivers," filed May 12, 2023; and U.S. Provisional Patent Application Ser. No. 63/469, 341, "Mobile Networks and Smart Luminaires for Safety Systems," filed May 26, 2023, each of which are hereby incorporated by reference in their entirety.

FIELD OF THE DISCLOSURE

The present disclosure pertains to LED luminaires, LED lights, light fixtures, systems, and method of use that include modular or replaceable LED systems that can be replaced, modified, or upgraded rapidly and conveniently.

BACKGROUND

Fluorescent lights are often provided in troffers that may suspend from a ceiling or be fitted in drop-down or T-bar type ceilings, but may also be provided in a non-drop ceiling. Due to the potential for cost savings, there is an increasing trend to retrofit or replace fluorescent light fixtures with light emitting diode (LED) lights, a type of solid-state lighting with many advantages over legacy systems. Many customers of LED lights assume that the lights would have essentially unlimited lives, but they may later discover that LED lights can fail or otherwise need replacement due to various problems such as poor thermal management causing failure from LED chips overheating, failure of LED drivers, or the need to upgrade drivers, upgrade printed circuit boards (PCBs), add controls, or improve color, intensity, or other features, all of which may lead to the need to replace or upgrade old systems. Some customers purchase LED systems with basic control systems or no control at all (they tend to be optional third-party add-ons), understanding that they can later add more sophisticated controls when needed, only to find that accessing the driver or other hardware in order to add an upgraded control system is a difficult operation.

In general, replacing, repairing, or upgrading LED systems can be costly and inefficient, in part because access to components such as drivers may require accessing troffers from above, which can be inconvenient or dangerous, or infeasible for some ceilings. It may require disassembling complex structures involving the use of tools, the potential for lost parts, the risk of injury, the need to turn off electrical power, and general lost time and lost productivity for the complex task. There is a need for improved LED systems that mitigate one or more of these or related problems and make the task of modifying an LED system more convenient and less costly.

Another common problem in the lighting industry is that upgrading performance of lights (e.g., installing upgraded LED lights with improved efficiency, color, lifetime, etc., or installing improved drivers or other improved components) typically involves discarding the entire troffer (the frame and the associated components), resulting in unnecessary waste going to landfills and extensive labor to remove old units and deal with the wiring and other tasks involved in installing new units. There is a need for more environmentally friendly solutions that reduce solid waste and reduce wasted time to replace, upgrade or repair lights. The solutions discussed herein in many aspects may address one or more of the previous problems noted here, but it is not necessary for any aspect as claimed to resolve all or any of the various problems mentioned or alluded to herein in order to be within the scope of the claims.

SUMMARY

A modular LED luminaire adapted for mounting in a ceiling or other location includes a frame having a recess, which may be a central recess, for receiving a detachable LED component chassis, which in some aspects may substantially span the length or width of the frame, and which may have a front side with LED lights and a back side having other components such as an LED driver, a receptacle for connection to a power line, and other modules as desired including sensors (cameras, microphones, motion detectors, air quality sensors, light sensors, gunshot detectors, etc.), one or more radios, switches for adjusting settings, surge suppressors, backup power supply, etc., which may be plugged in or otherwise easily attached or disconnected, as desired.

When installed for normal use, the component chassis may be attached to the frame by one or more first engaging elements on one side of the component chassis that are adapted to connect to a portion of the frame, and by one or more second engaging elements on one or more other sides of the component chassis. When the one or more second engaging elements are disconnected from the frame, the detachable component chassis is adapted to be partially detached from the frame while one portion thereof remains connected to the frame, such that the partially detached component chassis can be swung or rotated about an axis or point near the region where the connection is maintained by the one or more first engaging elements and thus remain securely connected with the back side of the component chassis thereby accessible for treatment. In this "open" orientation, the component chassis is still attached to the frame via a connection in the form of one or more first engaging elements, which may be rotatable or may be flexible or rigid, and while "open" can be readily and conveniently serviced or treated as needed for repair, replacement of components, upgrading, adjusting settings, etc., and then be swung or rotated back into position against the frame such that the one or more first engaging elements continue to connect the component chassis to the frame, and such that the one or more second engaging elements can then be connected once again to the frame to secure the component chassis in place in a fully attached mode. In some aspects, the one or more second engaging elements may be movable, i.e., have a movable element that makes the connection to the frame, such as a sliding member, a rotating latch, a key-and-lock mechanism, a snap-fit connection, or geometric interlock (e.g., interlocking parts such as a male-female connection, dovetail connection, etc.), etc. In some aspects, the one or more first engaging elements may be comprise a flexible member such as a flexible rod, flexible beam, cable, chain, tether, etc. that forms a bendable or flexible connection, or may comprise a rigid structure that forms a connection that nevertheless may be rotated relative to the frame, such as a mechanical interlock adapted to remain securely connected in two or more geometrical orientations or a hook that engages with a ring, rod, or bar wherein the hook can rotate its orientation with respect to the ring, rod, or bar while still remaining engaged. In some aspects, however, the one or more second engaging elements are not a cable, cord, or tether, but have a rigid element adapted to engage with a portion of the frame or a rigid structure such as a rail connected to the frame.

As a form of a bendable connection, a tether may join the component chassis to the frame, such as a length of flexible cord, chain, cable tie, or wire that may be secured to the backside of the substrate and have a loop, ring, snap, tab, finger, protrusion, or other attachment means on the frame that it can join to. Such tethers may include an adjustable or tightenable tether that can be made taut when needed. For example, tightening and securing may be done with a cable tie with a ratcheting or one-way closure mechanism, a cord tied with a taut-line hitch knot or other adjustable or slidable knots, or mechanical devices such as a cam buckle, ratchet strap, cleat for securing a cord or cable, turnbuckle, cord lock, sliding clamp or grip, wire rope clamp, various grips and clamps, etc. The tether may extend from a structure such as a pin, hook, ring, finger, ledge, screw, loop, slot, protrusion, clamp, tie, bolt, etc. on the component chassis to connect to a structure such as a pin, hook, ring, finger, ledge, screw, loop, slot, protrusion, clamp, tie, bolt, etc. on the frame, thereby providing a secure connection that can be rotated relative to the frame and continue to securely hold the component chassis in place in a second orientation wherein the one or more second engaging elements are disconnected from and remote from the frame, thereby making the back of the component chassis more available in the second orientation, especially to a person standing below the frame. In some cases, the tether or other components of the one or more first engaging elements may be loosened, extended, or otherwise adjusted prior to or during the process of moving the component chassis from its first orientation to the second orientation with the one or more second engaging elements disconnected and remote from the frame, and they then can be tightened again to better secure the component chassis when it is moved to the first orientation, or before or after it is moved to the first orientation. But in some aspects, adjustment of the tether or other connections is not needed when moving from the first to the second or from the second to the first orientation.

In some aspects, the fully attached LED component chassis is held in place with respect to the frame by the one or more first engaging elements on one side of the component chassis acting in cooperation with one or more second engaging elements that may be on one or more other sides of the component chassis such as on a second side opposing the first side of the component chassis. In some aspects, the fully attached component chassis is converted to the partially detached "open" state by releasing or detaching the one or more second engaging elements, then swinging or rotating the component chassis about an axis or point near the one or more first engaging elements that are adapted to remain securely connected to the frame after the component chassis is swung or rotated about an angle greater than 10 degrees, 20 degrees, 30 degrees, or 45 degrees, such as from 25 degrees to 130 degrees relative to the plane of the component chassis when it is fully attached and in position against the frame, thereby exposing the back side of the component chassis for convenient treatment while remaining secured to the frame through the rotatable one or more first engaging elements. This process of converting the fully attached component chassis to the partially detached but still secured "open" orientation can, in some aspects, be done without the use of tools and in some aspects, can be done with one hand.

In one aspect, the one or more first engaging elements may have multiple parts such as two parts, with a first part adapted for connecting the component chassis to the frame when the component chassis is in the first orientation (e.g., fully attached to the frame, with the component chassis largely in the plane defined by the outer portions of frame generally visible to a viewer looking at the installed LED luminaire) and a second part adapted for connecting the component chassis to the frame when the frame is in the second orientation. For example, a ceiling-mounted frame may hold the component chassis in place with an L-shaped rigid structure extending from a first side of the component chassis that catches the metal wall surrounding an opening in the recess of the frame of the LED luminaire, but once the opposing one or more second engaging elements are disconnected, the component chassis may be lifted slightly to remove the one or more first engaging elements of the component chassis from the frame, and then a different component on the frame or on the component chassis or both may be used to suspend the component chassis from the frame as the component chassis hangs from its first edge from the frame. In such an example, a second part of a first engaging element of the component chassis may have one or more rings mounted to the first edge of the component chassis or to the back side of the component chassis that can be slide into or engage with fingers or hooks that project from the frame such as from the first edge of the recess of the frame, which allow a mechanical connection between the frame and a suitable side of the component chassis, thereby providing access to the back side of the component chassis and allowing a technician to carry out desired operations or treatments without the need to hold the component chassis. In some aspects, however, the one or more first engaging elements are one-part systems, meaning the same components are adapted to hold the component chassis in place against the frame as it is moved from a first to a second orientation which differ by an angle of at least 10, 15, or 20 degrees, etc.

The frame and the component chassis may each have a front side, generally the side from which light is radiated, which, for ceiling mounted luminaires, is generally the side towards the floor below. The frame and the component chassis also may each have an opposing back side, which, for ceiling mounted luminaires, may be the side towards the ceiling, and, for the component chassis, may be the side where the LED driver is mounted. The frame may serve as a housing for the component chassis and may have a recess or opening for receiving the component chassis, which can be securely attached to the frame by the one or more first and second engaging elements.

The novel design of the component chassis allows for its removal and replacement without necessitating the detachment of the entire frame, and in some aspects, the component chassis can be partially detached from the frame while one portion of the component chassis remains attached to the frame, allowing an operator to access components that are not normally accessible when the component chassis is fully attached to the frame (e.g., the back side of the component chassis). Such components may include the LED driver, a settings panel for adjusting the settings of the LED lights such as temperature or wattage, the power line that attaches to a connector or receptacle of the component chassis, or connectors adapted to receive a sensor, radio, etc. Thus, in such aspects, an operator can work on the back side or, in related aspects, on either side of the component chassis without having to remove the entire luminaire or without having to hold a detached component chassis, and detachment and attachment may be achieved without the need for tools.

The one or more first engaging elements, in some aspects, are adapted to suspend the component chassis from the frame (e.g., when mounted in or on a ceiling) or otherwise maintain connection between the component chassis and the frame when the one or more second engaging elements are detached and the component chassis is partially rotated away from the frame to expose the rear side of the component chassis to a worker positioned at the front of the frame. The first and second engaging elements may be on opposing sides such as the long sides or short sides of the component chassis, but need not be. For example, the one or more first engaging elements may be on a long side of the component chassis while the one or more second engaging elements are on one or two of the shorter sides or on three other sides of the component chassis, and vice versa. The one or more second engaging elements may also be movable such as a slidable lock, a rotating latch, a sliding latch, a deadbolt lock, etc., but may also employ magnets, mechanical interlocks, etc.

In some aspects, a connection between the component chassis and the frame, whether involving a first or second engaging element, but particularly a first engaging element, may be formed by the interaction of a solid surface attached to the frame adapted for connection with a rigid or flexible structure attached to the component chassis, whereby once the connection is formed, the rigid or flexible structure of the component chassis may move to a new orientation as the component chassis is swung or rotated to a new orientation or position relative to the frame, resulting in the connection being maintained and able to bear the load of the component chassis without further support from, say, human hands or an external object propping up the component chassis. For example, the solid surface attached to the frame may be an opening in the wall of the frame in a recess of the frame adapted to receive the component chassis, or it may be a hook, a ring, a rod or bar, a swiveling component such as a ball socket adapted to receive a rod or a rotatable socket for receiving a snap-in connection, a hook, rod, ring, etc. onto which a cable tie, chain, or flexible member can be attached that is also attached to the component chassis, thereby providing for rotation by the bending or other motion of the flexible member, etc.

The recess of the frame may comprise a first edge with one or more openings for receiving one or more first engaging elements and a second edge, such as an opposing edge, with one or more openings adapted to receive one or more second engaging elements. The recess may have a back surface with one or more openings adapted to receive a power cord or other cables or to serve other purposes, as desired. In some aspects, the recess need not be enclosed by solid material but may be largely open, such as open over the entire body of the component chassis or over at least 50% of the region above the component chassis. In some aspects at least portions of the recess are covered with solid material such as metal or plastic to protect the component chassis, and in such aspects at least 50%, 60%, 70%, 65%, 80%, or 85% of the space above the component chassis (speaking here of am LED luminaire in the horizontal orientation as in a ceiling mount) is covered by solid material associated with the frame (e.g., part of the frame). In aspects in which the recess largely lacks a back surface, the first and second edges of the recess of the frame may only be present where connections with the component chassis are needed.

In some aspects, the first and second edges of the recess of the frame form an obtuse angle relative to the plane of the frame such as from 90 degrees to 140 degrees, or from 100 degrees to 135 degrees. In some aspects, both the first and second edges of the recess each have one or more openings adapted to receive the first engaging elements and one or more openings adapted to receive the second engaging elements, such that there are suitable openings on both the first and second sides of the recess to receive the first and second engaging elements regardless of how the component chassis is oriented when it is installed (i.e., it can be revolved 180 degrees about a centerline passing through and normal to the plane of the component chassis and still be securely fastened as its first and second engaging elements successfully interact with the openings of the recess of the frame or with other aspects of the frame, such as a mounted rail or other structure adapted to engage with the first and/or second engaging elements of the component chassis. In some aspects, the first edge of the recess may be a mirror image of the second edge of the recess, and either edge can serve as the first edge based on which edge receives the first engaging elements of the chassis.

Thus, in one aspect, the first edge of the recess of a frame is adapted to receive a first engaging element from a first side of the component chassis. The first engaging elements may have tabs or projections that may, for example, have an L-shape, a hook shape, a curled lip, or the like to guide interaction with the edge of the recess of the frame and, in some aspects, to also hold the component chassis in place in, for example, a hanging position, as the component chassis is being adjusted (e.g., adjusting settings on the driver such as LED color or wattage), upgraded (e.g., adding a sensor or other device such as a Bluetooth radio, motion sensor, microphone, camera, and the like), repaired (e.g., replacing a surge suppressor or fuse, LED driver or driver elements, damaged LED light strip, etc.), installed, replaced, or removed (all such actions may be included when speaking of the component chassis as being "treated" or receiving "treatment"). Thus, the one or more openings in the first edge of the recess of the frame can not only receive the engaging elements from the component chassis to hold it in place during regular operation of the LED luminaire (e.g., in a horizontal orientation while the frame is also in a horizontal orientation to provide light to a region below), but during repair, upgrading, or replacement of the component chassis, components of the component chassis, or other aspects of the LED luminaire or during modifications to the wiring to or from the LED luminaire, the one or more openings in the first edge of the recess of the frame can serve to hold the component chassis in place while it is temporarily in a different orientation for treatment of the component chassis.

Such a different orientation may include a substantially vertical orientation of the component chassis, hanging from the substantially horizontal frame by the first side of the component chassis (or rising rather than hanging in the case of a horizontal frame that is oriented to provide light in the upward direction), or may include a substantially non-vertical orientation such as a substantially horizontal orientation as the component chassis remains attached to the frame of a wall-mounted LED luminaire, for example. In general, the "different orientation" may involve an angle between the plane of the frame and the plane of the substrate of the component chassis of at least 10, 15, or 20 degrees such as from 20 degrees to 160 degrees, from 30 degrees to 120 degrees, from 45 degrees to 120 degrees, from 60 degrees to 100 degrees, from 75 degrees to 110 degrees, or about 90 degrees.

The different orientation is typically understood to be a temporary state as the component chassis is temporarily "opened" or made accessible while still being attached to the frame and, if desired, to the power source such as AC line voltage. In such cases, the one or more first engaging elements attached to or extending from or near the first side of the component chassis provide a connection to the frame, and particularly connect with the frame at or near the one or more openings of the first edge of the recess of the frame without aid from the one or more second engaging elements. The one or more openings in the first edge of the recess of the frame may simply function as a slot or other opening to receive engaging tabs or the like, or may have a shape such as a T-shape adapted to securely hold the wider cross-beam of a T-shaped engaging element. The solid walls around the one or more openings may also have a curved or angular lip or a ledge to further interact with curvature or other structural features of the one or more first or second engaging elements of the component chassis to ensure that the component chassis is securely held on place. The one or more openings of the first edge of the recess of the frame in particular may be adapted through mechanical interlocking or related methods such that the component chassis may be securely held in place by the one or more first engaging elements associated with the first side of the component chassis while hanging from the frame without the aid of the one or more second engaging elements on another side of the component chassis (or, more generally, when the second engaging elements are not connected to the frame but are rotated away from the frame).

In some aspects, the component chassis may rotate about its first edge or about a line proximate the first edge of the component chassis, rotating relative to the frame or its plane, defining for example an approximately 90-degree angle (e.g., from 30 degrees to 120 degrees) between a first orientation in the fully connected state (a state with connections from both the first edge of the component chassis and connections along at least one other edge of the component chassis such as a second edge opposing the first edge of the component chassis) and a second orientation in a partially connected state, wherein the component chassis is held in place only along the first edge thereof, or defining any of the previously mentioned ranges of angles.

In some aspects, the frame itself can be held in place with frame engaging elements on opposing sides that attach to mounting brackets or other mounting fixtures, wherein the frame can be released from one side and allowed to swing down or otherwise rotate about the opposing side that remains connected with rotatable engaging elements. Such frame engaging elements may include one or more projecting elements such as a screw head adapted to engage with one or more slots in the mounting fixtures, which may serve as pivot points to allow the frame to swing up or down as it rotates about the projecting elements while secured in a slot or track. In such a case, when the other end of the frame is brought up into contact with the fixtures for securing the frame, the fixtures may have, for example, pins or other elements about which a corresponding rotating latch on one or more sides of the frame may engage. Closing the rotating latch may then firmly secure the frame in place against the fixtures in a ceiling mount or other mounting system. The combination of a static projecting element engaging with a slot and a remote movable or rotating element engaging with a structure in the fixtures provides a system for securing the frame while also allowing it to rotate substantially (e.g., up to 90 degree or more) relative to the fixtures and, for example, the ceiling or wall it is being attached to. This can also simplify installation, removal, repair, and the like.

Thus, in installing the frame, one or more rigid engaging elements on one end of the frame (e.g., on opposing sides at an end of the frame) may provide a connection to an opening in a fixture or suspending structure, and allow the frame to be rotated about that end to bring the opposing end into place in the ceiling or other structure receiving the frame, such that the opposing side of the frame can be fixed in place as one or more movable frame engaging elements are moved to secure the opposing edge of the frame. The one or movable frame engaging elements may include, for example, a rotating latch that encircles a pin to lock the frame into place, a sliding latch or lock, hook and loop connections (which generally require some degree of motion to make the connection firmly), tab and groove connections, etc. Screws, bolts, snaps, hooks, and the like may be used as well.

Mechanical Interlocking

In general, for the connection of the component chassis to the frame as well as the connection of the frame to the receiving stricture, typically via various fixtures, one or more the engaging elements or other attaching devices may employ mechanical interlocking, particularly via geometric locking. The principle of mechanical interlocking may involve steric hindrance or geometrical interlocking as the shapes of the connectors interact with corresponding receiving slots or receptacles to secure the component chassis or frame in place and prevent unintentional disconnection. At the same time, the receiving slot can provide for easy disengagement when a specific motion or action is performed, such as lifting a T-shaped engaging element out of the lower slot of a T-shaped opening to allow the broader beam of the engaging element to reach the broad top of the T-shaped opening for easy removal.

The T-shaped connector may also integrate an L-shape, such that an L-shape is apparent when viewed from a side while the T-shape is evidence when viewed from the front or at an angle normal to the view showing the L-shape. Such a connector may have a rail or beam defining the lower part of the T-shape, and then a broader element that may extend out of the plane of the rail or beam to serve as a catch element for engaging the material of the frame such as the material defining the shape of an opening that receives the T-shaped connector. When the broader element is resting against a surface such as the edge of a slot or other opening in the frame of an LED luminaire, for example, the connector cannot be removed from the frame by pulling the connector away in a direction parallel to the plane of the lower body of the connector because the upper body of the connector will not be able to pass through the narrow lower leg of the T-slot due to steric hindrance, and even when raised to reach the upper opening of the T-slot, the bent or normally projecting orientation of the upper portion of the T-connector will prevent sliding out of the upper portion of the T-slot unless the connector is further raised to prevent the bent portion of the connector from catching on the edge of the upper slot.

Any variant of T-slot and T-connectors may be used, including V-slot rails, etc. Other examples of mechanical interlocking that may be considered include a keyhole mechanism with a keyhole slot, in which a circular connector with an attached shaft can be inserted into a larger circular opening of the keyhole slot and then slid into a narrower slot, locking it in place. Also to be considered is a bayonet mount in which a component with pins engages with a slot; dovetail joints in which a trapezoidal pin on one piece fits into corresponding slots on another piece; mortise and tenon connections; barrel locks that form a pivotable connection; etc.

Also to be considered is a simple connector such as an L-shape or other suitable shapes, including use in conjunction with a simple slot such as a rectangular slot in the connecting surface (e.g., in the recess of the frame or in a fixture for holding the frame). While an L-shape could be used with a simple rectangular slot, when rotated 90 degrees, the base or foot of the "L" would be resting on the edge of the slot and could be at risk of falling out. This risk could be reduced by replacing the lip with a 90-degree angle with a lip at a more acute angle, such as from 30 to 80 degrees, to give an "acute L" shape similar to the top of the numeral "1" (when written with a descending line or serif). The acute angle of the lip maybe formed by a straight line, but a similar catch can be obtained using a curled lip, a curved hook-like shape (similar to a shepherd's staff), etc. The engaging element may also have a pin or 90-degree protrusion for engaging a slot when in a horizontal position, and a further lip at an acute angle so hold the engaging element in place when it is rotated relative to the slot. Thus, "acute L" shape may provide a lip to engage a simple rectangular slot and to allow substantial rotation about the slot while still maintain a reliable connection.

Thus, an acute angle connector may be employed with an engaging element that may be substantially rectangular or planar apart from the acute angled element, or may be curved, T-shaped from a first perspective but L-shaped or acute-L shaped from a second perspective, etc. The angled portion of the cute angle connector may serve as a lip in which the tip of the descending angled portion engages the surface adjacent an opening to hold the connector in place relative to the opening, while when the connector is rotated to a different orientation such as from horizontal to vertical, the cusp of the acute angle connector engages with the material at the edge of the slot to hold the connector in place.

An acute angle connector or L-shape connector or simple projection from a connector surface may be used for either or both of the first and second engaging elements of the component chassis. For example, a movable engaging element with, say, a sliding or rotating motion being used to secure the connection, may have an acute angle for engaging the edge of a slot. In some aspects, such an acute angle could also permit the one or more second engaging elements to secure the component chassis without the aid of the one or more first engaging elements, if desired, thereby making it possible to "open" the component chassis for upgrades, repairs, etc., by having it hang securely from either side, as desired.

In some aspects, the angle of the acute angle connector or geometry in general of the engaging elements may be adjustable to optimize performance for the product or desires of the user. Thus, an engaging element may feature a mechanism to adjust the angle of the angle connector. In other aspects, adjustment of the connectors may be made by adjusting the height of a screw or bolt that may serve as a lip or catch. Adjustment may also be made in the materials of the engaging elements, which may be customizable by adding materials such as adhesive patches that provide rubberized materials for increased friction in a slot, etc. Locking mechanisms may also be added to reduce the risk of unwanted or unauthorized release of the component chassis or of the frame. Thus, a clip or latch may be used, etc.

Movable Engaging Elements

In some aspects, the component chassis includes one or more engaging elements on a first side of the component chassis and one or more movable engaging elements on at least one other side of the component chassis such as an opposing side, wherein the movable engaging elements may include a sliding lock, a rotating hinge, a locking lever, and the like.

Thus, in some aspects, a securing mechanism is provided for securing one side of the component chassis with one or more movable engaging elements, wherein the securing mechanism may include, for example, a rotatable latch or tongue, operationally connected to a knob or handle situated on the component chassis surface. In a default position, the latch or tongue may remain retracted, allowing for easy placement or removal of the component chassis. Upon rotation of the knob or handle, such as through a 90-degree turn, the latch or tongue extends outwardly, engaging a corresponding groove or recess located on the frame or adjacent structure. This groove or recess may be adapted to receive and securely hold the extended latch or tongue, thereby locking the component chassis in place.

The groove or recess may feature a shape complementary to the latch or tongue, ensuring a snug fit when the latch is extended. Such a design can provide both a secure connection and a quick-release mechanism, as a simple rotation of the knob or handle retracts the latch or tongue, freeing the component chassis for adjustments or removal.

Furthermore, the knob or handle may incorporate tactile or visual indicators to signify the latch's position.

In one aspect, the latch or tongue may feature a cam-like design, wherein the rotation of the knob or handle causes a linear movement of the latch, driving it into or out of the groove or recess. This cam action provides a robust and secure locking mechanism, resistant to unintentional disengagement.

In another aspect, the groove or recess may incorporate a spring-loaded catch or detent, providing an additional layer of security by resisting unintentional rotation of the knob or handle, thereby preventing accidental release of the component chassis.

In general, the one or more movable engaging elements of the component chassis may be adapted to engage with one or more corresponding openings located on the frame, such as along one edge of the recessed portion of the frame opposite from the first edge of the recessed portion of the frame. This engagement mechanism may aid in the stabilization and retention of the component chassis. Upon full elevation of the component chassis against the frame and the establishment of the necessary electrical connections, a movable securing mechanism including the movable engaging elements, such as a sliding lock present on the component chassis, is activated to secure the component chassis in place. This mechanism, in conjunction with the protruding elements, can ensure the component chassis' secure attachment to the frame.

For maintenance or repair purposes, the movable securing mechanism can be disengaged, allowing the component chassis to pivot around the edge where the protruding engaging elements are inserted into one or more openings of the frame. This pivotal movement may permit a 90-degree rotation relative to the attached edge, facilitated by the specific design of the protruding engaging elements, ensuring continued engagement with the frame's openings during rotation.

In another aspect, the movable securing mechanism is a slide lock positioned centrally on the panel's side opposite the protruding engaging elements. This slide lock engages with a corresponding slot on the frame, providing an additional layer of security. When engaged, the slide lock prevents any unintentional dislodgment of the central panel. However, when disengaged, it allows the central panel to pivot around the L-shaped hooks or other engaging elements for easy access during repairs.

Further, the frame's openings can be reinforced with metal or durable plastic to ensure longevity and reduce wear over time. These aspects provide a robust and user-friendly design, ensuring easy maintenance without compromising the apparatus's structural integrity.

In another aspect, the connection between either the first engaging elements or the second engaging elements and the frame can also be made with a hinge element having a slidable pin or bolt joining aligned tubular units to form a hinge such as a barrel hinge that can rotate about the pin or bolt that passes through the tubular units. In one aspect, a spring-loaded barrel hinge could have the pin or bolt held in place by a spring that could be pulled out to disconnect the barrel hinge to disconnect an engaging element, and then this could be readily reconnected.

In another aspect, the component chassis need not rotate 90 degrees relative to the frame, but could rotate a smaller extent such as 45 degrees or less or 35 degrees or less, with the degree of rotation constrained by a cable. In such aspects, the first engaging element can be relatively simple such as tabs engaging with a slot in the frame or a downward lip on the edge of the component chassis that engages with an upward lip on a shelf or ledge extending from the frame. In such aspects, the second engaging elements need not be slidable or rotatable, but could be based on magnets that join the second edge of the component chassis to the frame, for example. In related aspects, the rotation need not about a long edge of the component chassis, but could be about a short edge with the length of the component chassis able to rotate about the short edge. Again a cable may be in place between the frame the component chassis to constrain the degree of rotation while allowing the component chassis to be moved to an orientation that is open enough to make treatments to the back side of the component chassis (e.g., at an angle of at least 10, 15, 20, 25, or 30 degrees relative to the "closed" position or to the plane of the frame).

Such a cable could be easily installed using a T-bar mechanism or a toggle hanger such as a Gripple toggle hanger or aircraft cable hanger. It may be fixedly attached at one end to the component chassis, for example, but removably attachable via the toggle hanger to the frame such as the rear surface of the recess of the frame. In the toggle hanger mechanism, a cross-beam threaded on a cable with a stop is aligned with the cable and inserted through a narrow opening in the frame it is being attached to, and then the cross-beam is held laterally in place on the frame. Removing the connection requires pushing the cable up and threading an end of the cross bream back into the slit or hole to pull the beam and the cable out.

Further Details

In related aspects, an LED luminaire is provided having (1) a frame having a first end and an opposing second end with a connecting plate (sometimes called a spine or beam) therebetween; (2) an LED component chassis having a substrate, a printed circuit board (PCB) attached to the substrate or serving as at least part of the substrate, one or more LED lights attached to the substrate, a driver attached to the substrate, and a connector adapted to receive power from a power source, the LED lights being in electrical connection with the driver; (3) a lens adapted for toolless connection to the LED panel; and (4) one or more first engaging elements associated with a first side of the component chassis adapted to attach to one portion of the frame and one or more second engaging elements associated with a second side of the component chassis and adapted to connect with a second portion of the frame, wherein the one or more first engaging elements cooperate with the one or more second engaging elements to hold the component chassis securely in place with respect to the frame, wherein the one or more first engaging elements are also adapted, when the one or more second engaging elements are disconnected from the second portion frame, to hold the component chassis as it hangs from the frame when the frame is horizontal to securely hold the LED component chassis onto the frame. In some aspects, the component chassis can be installed or removed without the need to de-energize the line power that supplies the LED lighting in the area. The power to the LED driver may be disconnected and reconnected to the main power with a simple snap-on connector that does not expose a worker to live wires, although the main power line can be de-energized if desired. In related aspects, connections can be made, components replaced, or the entire component chassis replaced without the need to use tools other than a human hand.

A lens may also be adapted to fit onto the frame or the component chassis, such as a snap-on plastic lens that can be inserted or removed by hand. The lens may be, for example, an injection molded plastic parabolic louver or other louver, or a plastic (e.g., polycarbonate, polymethyl methacrylate acrylic, and silicone). When in place, the lens may have a shape that is substantially that of a semicylinder, an arc, a parabola, a plane, or the like, or any useful shape suitable for a luminaire. The LED luminaire may be provided with more than one lens, if desired.

The lens may be a resilient, flexible polymeric material that can bend enough to engage with slots or grooves on the frame or, in some aspects, with grooves or channels on the component chassis, such as linear grooves or channels running along opposing edges of the component chassis. The lens may be connected or removed without the need for tools.

The component chassis may comprise a heat-conducting component such as a layer of aluminum in thermal contact with, or in proximity to, heat-generating elements such as the one or more LED lights, the printed circuit board, or the driver, etc. In addition to aluminum, other materials may be present such as materials used for printed circuit boards, including materials known as FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), CEM-5 (woven glass and polyester), or other materials, including other metals such as copper or silver, and composites with aluminum, copper, or other excellent conductors of heat.

The component chassis may also comprise or be associated with various sensors such as motion detectors, IR sensors, temperature sensors, brightness sensors, color sensors, cameras, RFID antennae and associated circuitry for reading RFID tags, antennae for detecting and transmitting other electromagnetic signals, Bluetooth systems, WIFI systems, telecommunications systems such as 3G, 4G, 5G, and 6G systems, microphones, video cameras, accelerometers, radar systems, LIDAR units, ionization detectors, smoke detectors, humidity sensors, etc. The component chassis may also comprise a microprocessor and a memory in order to receive, process, and transmit information such as signals based on data from sensors associated with the component chassis. Such sensors may be mounted on the substrate of the component chassis or may be mounted elsewhere on or near the frame of the luminaire but in communication with the microprocessor of the gear. Instructions for processing data or for regulating lights or other electronic devices may be stored in the memory. In some aspects, memory need not be mounted on the component chassis but may be remote to the component chassis as long as the component chassis is in communication with the memory.

The one or more LED lights in the LED luminaire may found in one or LED panels (e.g., a strip or array), each of which comprises one or more LED lights (e.g., LED chips or cells). The LED lights may be arranged in a predetermined pattern on the strip or panel, and are electrically connected to the driver that may control the amount of current or voltage supplied to each LED light or to the LED panels. The driver may be configured to cooperate with one or more sensors to regulate the current and/or voltage supplied to the LED lights based on various factors, such as the desired brightness, color temperature, or color rendering index (CRI) of the LED luminaire, or in response to motion or the presence of humans and many other factors.

The LED panels or strips may be mounted on a heat sink or other suitable material in the substrate that provides thermal management for the LED lights in addition to providing structural support. The heat sink may be designed to dissipate heat generated by the LED lights, the LED driver, or other components, to promote longevity of the LED luminaire.

The LED luminaire may also include various optical components, such as lenses (which may also be diffusers), diffusers, or reflectors, that are positioned over or near the LED lights to control the direction and distribution of light emitted by the LED luminaire. These optical components may be designed to provide various beam angles, light distributions, or other characteristics depending on the specific application of the LED luminaire.

In operation, the LED luminaire receives power from an external power source, which is typically an AC or DC power supply. In some aspects, the power supply may be direct DC current from solar power, wind power, wave power, or other non-fossil fuel sources, as well as batteries, capacitors, or supercapacitors, or may be any form of AC current and any suitable voltage or amperage. The driver regulates the current and/or voltage supplied to the LED lights based on the input voltage and various control signals, such as those received from a dimmer switch or other control device.

BRIEF DESCRIPTION OF THE FIGURES

FIGS. 9A-F show several aspects of a first engaging element from a side perspective.

FIGS. 10A-C show aspects of T-shaped first engaging elements viewed from the front side.

FIG. 11 shows the mechanical interlocking performance of a first engaging element with the wall material of the frame surrounding an opening.

DETAILED DESCRIPTION

Figure 1:
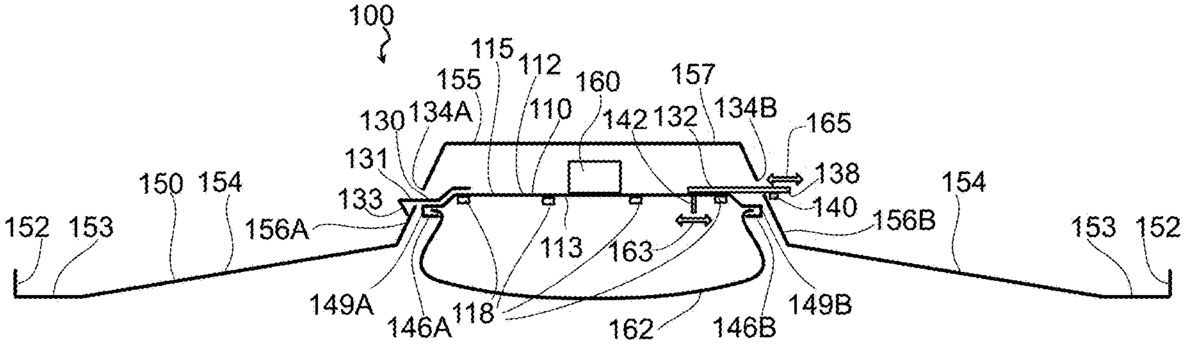
FIG. 1 depicts a cross-section of an LED luminaire.

FIG. 1 depicts a cross-section of an LED luminaire 100 having a component chassis 110 comprising a substrate 112 and having a front side 113 and a back side 115. The LED luminaire 100 further comprises a frame 150 having an outer edge 152 which can be used to attach to fixtures (not shown) associated with a suspension ceiling, fixed ceiling, wall, or other surfaces (not shown). The frame 150 may be made of sheet metal, composite materials, plastics, and the like, and further comprise a flat outer surface 153, a sloped reflector region 154, a recess 155 having a first edge 156A, and opposing second edge 156B, and a rear surface 157, wherein the recess 155 is adapted to receive the component chassis 110 (in some aspects, the rear surface 157 may be open in portions of the frame 150 or may be absent, and in some aspects the first edge 156A and second edge 156B may be substantially shorter than shown here). The first edge 156A of the recess 155 has a first opening 134A (only one first opening 134A is visible in this cross-section, but it should be understood that two or more first openings 134A may be provided in the first edge 156A of the recess 155 along the length of the first edge 156A normal to the plane of the drawing) and the second edge 156B of the recess 155 has a second opening 134B (again, only one is shown but two or more second openings 134B may be present along the length of the second edge 156B normal to the plane of the drawing). The first opening 134A is adapted to receive a first engaging element 130 that is attached to the component chassis 110, while the second opening 134B is adapted to receive a second engaging element 132 that is also attached to the component chassis 110. In some aspects, the first engaging element 130 and the second engaging element 132 can be substantially similar and operate by the same method, but as depicted the two are different, with the first engaging element 130 being substantially static while the second engaging element has a movable mechanism. The first engaging element 130 has a rigid structure 131 mounted to the component chassis 110 (e.g., to the substrate 112) which extends outward past a first edge 149A of the component chassis 110 and into the first opening 134A of the recess 155. At the end of the rigid structure 131, which may be a flat plate, a ribbed or reinforced plat, a rectangular bar or beam, etc., a catch element 133 is present which as shown bends downward to form a lip or catch that can engage the frame 150 surrounding the first opening 134A to hold the rigid structure 131 and the associated component chassis 110 in place with respect to the frame 150. The catch element 133 may form an acute angle with the rigid structure 131, but may also be curved such as a curled lip or hook-like structure (not shown).

The second engaging element 132 is similarly adapted to engage with the second opening 134B in the second edge 156B of the recess 155 and to be restrained by the material of the frame 150 adjacent the second opening 134B. Here, however, the second engaging element 132 is movable, having a movable plate 138 that can be moved manually by moving an attached pin 142 that projects through an opening (not shown) in the substrate 112. The range of motion as shown by first arrows 163 is a short distance from right to left (sideways) as depicted, capable of moving the movable plate 138 into or away from the second opening 134B, as shown by second arrows 165.

Here the movable plate 138 is slightly higher than the rigid structure 131 that extended into the first opening 134A, and thus the second opening 134B as shown is slightly higher than the first opening 134A (e.g., at least 1 cm higher, such as from 1 to 10 cm or from 2 to 7 cm) due to its attachment to the relatively more elevated body of the component chassis 110 rather than extending from a lower surface of the component chassis 110 as shown for the first engaging element 130.

The outer edge of the movable plate 138 may have a projection 140 that can serve as a lip or stop to prevent accidental release of the second engaging element 132 from engagement with the frame 150 at the second opening 134B of the second edge 156B of the recess 155 of the frame 150. The projection 140 may be a screw, a rubber foot or stopper, a plastic or metal pin, a component stamped or cut from the material of the movable plate 138, etc. The presence of the projection 140 may require lifting of the component chassis 110 to make it possible to slide the movable plate 138 away from the frame 150.

The first edge 149A of the component chassis 110 may define a first channel 146A such as a linear channel adapted to receive an edge of a lens 162 that can be held in place over the component chassis 110. The second edge 149B of the component chassis 110 may further define a second channel 146B for receiving an opposing edge of the lens 162, with the first channel 146A and the second channel 146B cooperating to hold the lens in a desired configuration.

Not shown on the component chassis 110 is a receptacle to receive power from a power line (also not shown), sensors such as motion detectors that may be adapted to function through the lens 162, radios such as Bluetooth or WIFI systems, wattage and color adjustment systems to control the appearance of the LED lights 118, etc.

Figure 2:
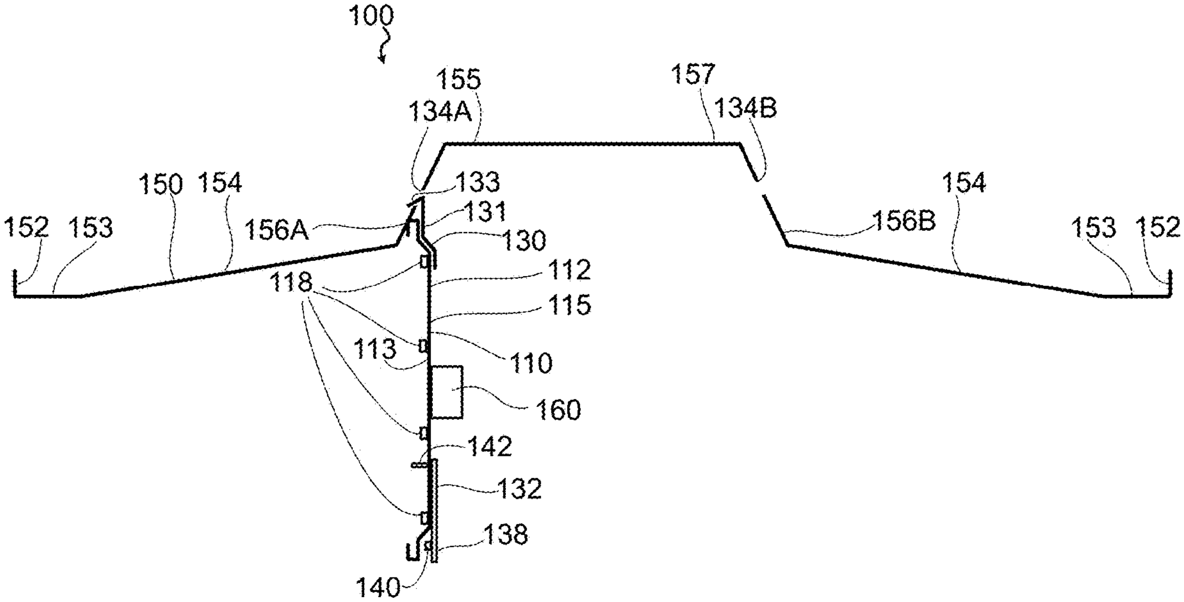
FIG. 2 depicts the cross-section of the LED luminaire of FIG. 1 after the component chassis has been rotated relative to the frame, but still attached by the first engaging elements.

FIG. 2 depicts a the cross-section of the LED luminaire 100 of FIG. 1 wherein the lens 162 has been removed and the second engaging element 132 has been detached from the frame 150 while the first engaging element 130 remains connected to the frame 150, followed by rotating the component chassis 110 relative to the frame 150 such that the second engaging element 132 has been moved to be remote from the frame 150 and from the second opening 134B in the recess 155. In this configuration, the component chassis 110 is "open" such that the back side 115 of the component chassis 110 (or of the substrate 112) with components such as the LED driver 160 are accessible for repair, adjustment of settings, replacement, upgrading, or adding new components (not shown) such as a motion detector, camera, microphone, radio, etc. after the component chassis 110 has been rotated relative to the frame 150, but still attached by the first engaging element 130. In some aspects, this can be done without removing the connection to the line power (not shown) that provided power to the LED driver 160. For example, to adjust the settings of wattage or color of the LED lights 118, a simple sliding switch of adjustment box (not shown) may be adjusted with the component chassis 110 in an open position without the need to disconnect power. Further, if the component chassis 110 itself needs to be replaced, the connection to the power line (not shown) may be disconnected using a simple snap-on connection or other connection, and then the component chassis 110 may be lifted away from the frame 150 and a new component chassis 110 can then be hung in place using its first engaging elements 130 attached to the first opening 134A of the recess 155 of the frame 150, and then the power line may be connected to the LED driver 160, and then the component chassis 110 may be rotated upward to bring the second engaging elements 132 proximate to the second openings 134B of the recess 155, and then the pin 142 can be moved manually to position the movable plate 138 into the second opening 134B of the second edge 156B of the recess 155 of the frame 150 to secure the component chassis 110 securely in contact with the frame 150.

Figure 3:
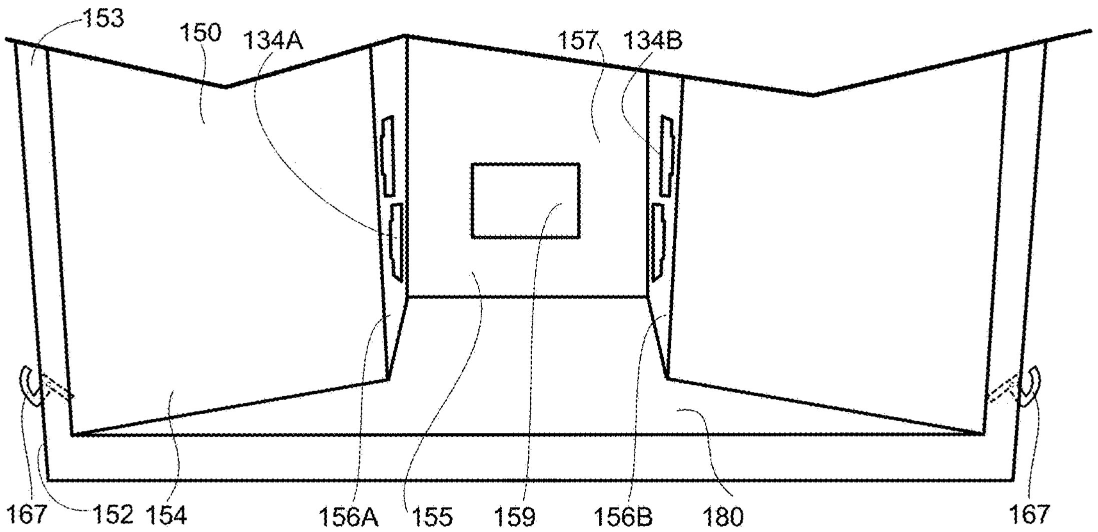
FIG. 3 depicts a perspective view of a portion of the frame of an LED luminaire.

FIG. 3 depicts a perspective view of a portion of a frame 150 having an outer edge 152, a flat outer surface 153, a sloped reflector region 154, a recess 155 having a first edge 156A, a second edge 156B, and a rear surface 157 therebetween. Also shown on the opposing edges of the frame 150 are two rotating latches 167 which can connect the frame 150 to fixtures (not shown) in the mounting surface, which may have pins (not shown) which the two rotating latches 167 can engage when they are rotated into a closed position about the pins (not shown) or other suitable protrusions. Also shown is a first end 180 of the frame 150, a first opening 134A and an opposing second opening 134B in the recess 155, and rear opening 159 in the rear surface 157 of the recess 155 through which electrical connections maybe made between the LED driver (not shown) of the component chassis (not shown) that can be secured to the frame 150 via engaging elements (not shown) interacting with the first opening 134A and the second opening 134B.

Figure 4:
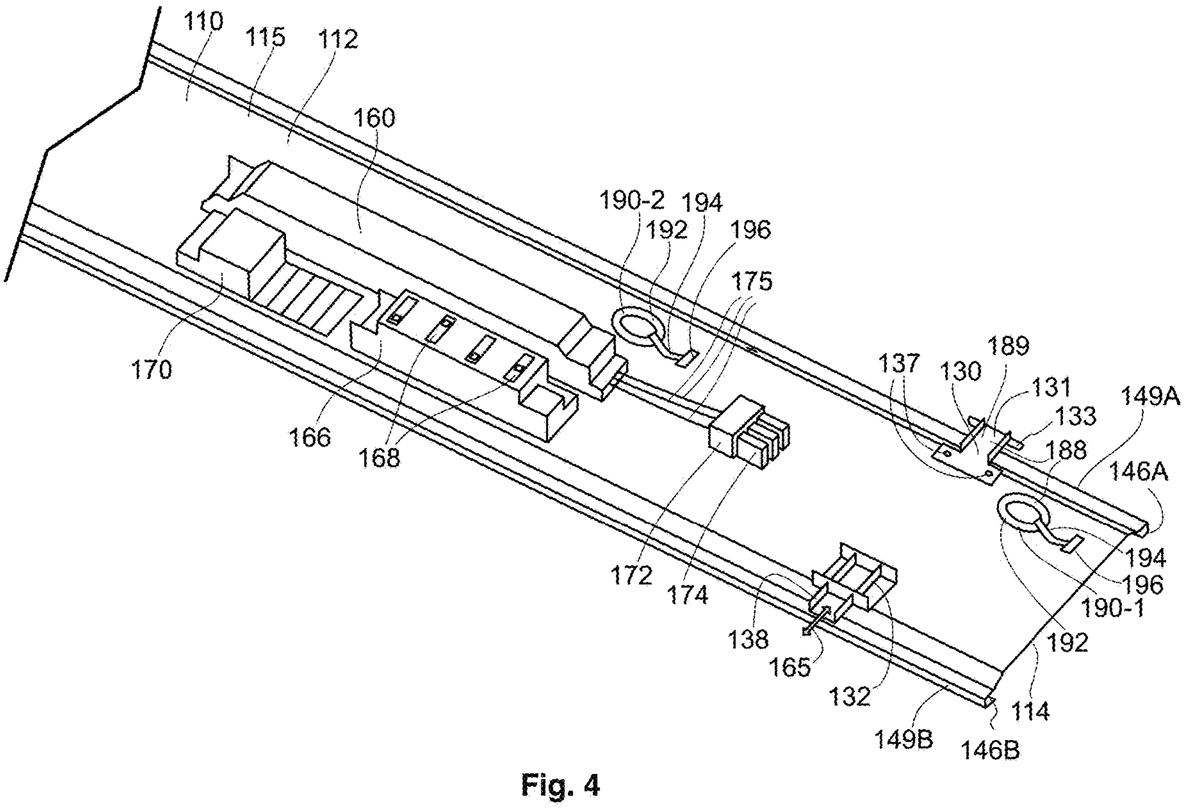
FIG. 4 depicts the back side of an LED component chassis.

FIG. 4 depicts the back side 115 of a component chassis 110 showing the substrate 112, the LED driver 160, a modular adapter 170 for receiving devices such as a radio or sensor (not shown), and a switching block 166 comprising a plurality of switches 168, here shown as slidable switches, for setting parameters for the LED driver 160 (e.g., color, wattage, etc.) or other components. Also shown are wires 175 connecting the LED driver 160 to a receptacle 172 with multiple connectors 174 for connecting to a power line (not shown). A first end 114 of the component chassis 110 is in view also.

A first engaging element 130 and a second engaging element 132 are shown on opposing sides of the component chassis 110. The first engaging element 130 has a movable plate 138 with direction of motion indicated by arrows 165. The first engaging element 130 is adapted to remain connected to the frame 150 (not shown) when the second engaging element 132 is disconnected from the frame 150 (not shown), allowing the second edge 149B of the component chassis 110 to move out of the plane of the frame 150 to make the backside 115 of the component chassis 110 readily accessible to a worker without the need for tools or the need to use one or both hands to hold the component chassis 110 in place when accessing components thereon.

An alternate form of connecting the component chassis 110 to a frame 150 (not shown) is also contemplated in which a two-part first engaging element 188 is shown in which the first engaging element 130 serves as the first part 189 of the two-part first engaging element 188 with a second part 190-1 also present, shown as a ring 192 joined to a tether or flexible band or cable 194 and secured to the substrate 112 by an anchor 196. Another second part 190-2 is also depicted to indicate that the number of second parts 190 need not be the same as the number of first parts 189 of a two-part first engaging element 188.

When the component chassis 110 is being installed, detached, or partially detached, the first part 189 of the two-part first engaging element 188 can be disconnected from the frame 150 (not shown) and the second part 190-1 (and/or 190-2, for example) of the two-part first engaging element 188 can be used to connect to a suitable protrusion from the frame (not shown) such as a finger, a hook, a tab, a suitable oriented pin, etc., and the component chassis 110 thus secured (e.g., by two or more such second-parts 190-1 and 190-2, for example) can then hang from the frame (not shown) to expose the back of the component chassis 110 for treatment by a technician without the need to hold it by hand.

The second-part 190-1, 190-2 of a two-part first engaging element 188 also illustrates the ability of an engaging element to be flexible. In alternative forms, it may also be adjustable or tightenable such as by cinching or adjusting the flexible band or cable 194. In other aspects, the anchor 196 may also be on the front side (not shown) of the component chassis 110. In other aspects, the flexible band or cable 194 and ring 192 may be attached to the frame (not shown) and adapted to engage with a hook, finger, tab, etc. (not shown) on the component chassis 110, which can then serve as an engaging element to connect to the frame (not shown). The flexible band or cable 194 in some aspects can also be replaced with a rigid connector (not shown) such as a rod or beam, while it could also be a chain, rope, etc., and still employ related principles such as connecting a ring or other loop or hook with a suitable structure for retention, and in some aspects such structures may serve as a replacement for the one-part first engaging element 130, adapted for engagement in two or more orientations of the component chassis 110.

Figure 5:
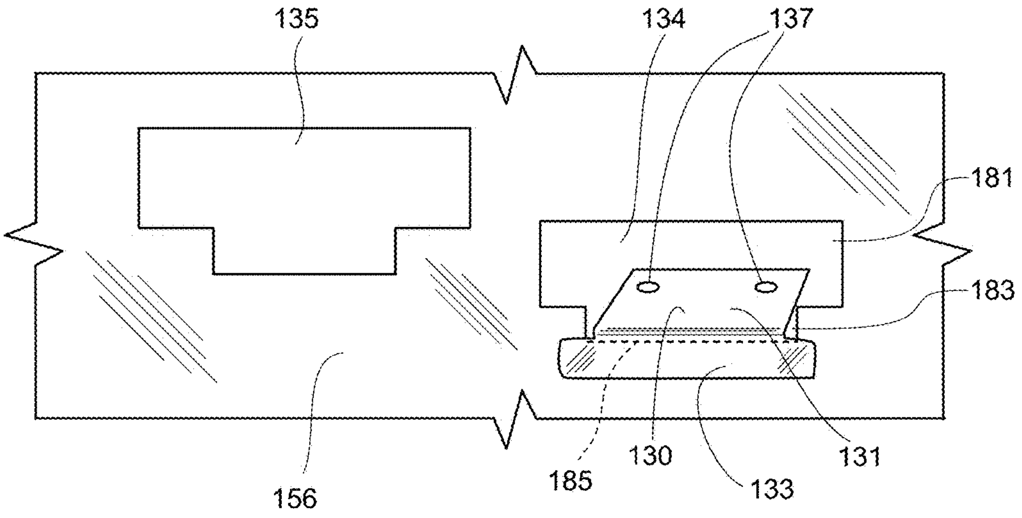
FIG. 5 depicts a view of a first engaging element of a component chassis engaged with the wall of a recess of the frame of an LED luminaire.

FIG. 5 provides a view of a first engaging element 130 having a rigid structure 131 and a catch element 133 attached to the rigid structure 131 defining both an L-shape from one perspective and a T-shape from another perspective. The first engaging element 130 is shown engaged with an opening 134, shown having a T-shape with a broad upper portion 181 and narrower lower portion 183 in an edge 156 of the recess 155 of the frame 150 (not shown). The rigid structure 131 of the first engaging element 130 extends into the opening 134, and the rigid material of the surrounding edge 156 of the recess 155 in the lower portion 183 of the opening 134. The rigid structure 131 lies on the lower edge 185 of the lower portion 183 of the opening 134. This mechanical interlock holds the component chassis 110 (not shown) in place related to the frame 150 (not shown) due to the restraint against the catch element 133 unless the rigid structure 131 and the catch element 133 are manually raised to allow the catch element 133 to pass through the broad upper portion 181 of the opening 134 to release the first engaging element 130 from the opening 134 of the recess 155.

Figure 6A:
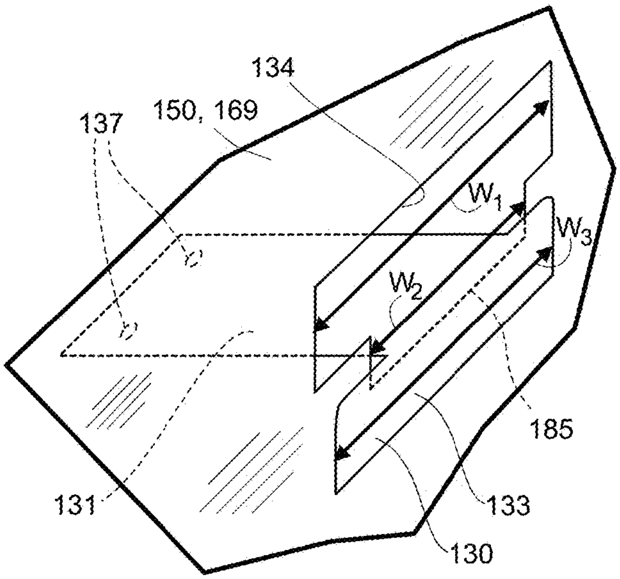
FIGS. 6A and 6B depicts views of a first engaging element in different orientations interacting with the wall of a frame.
Figure 6B:
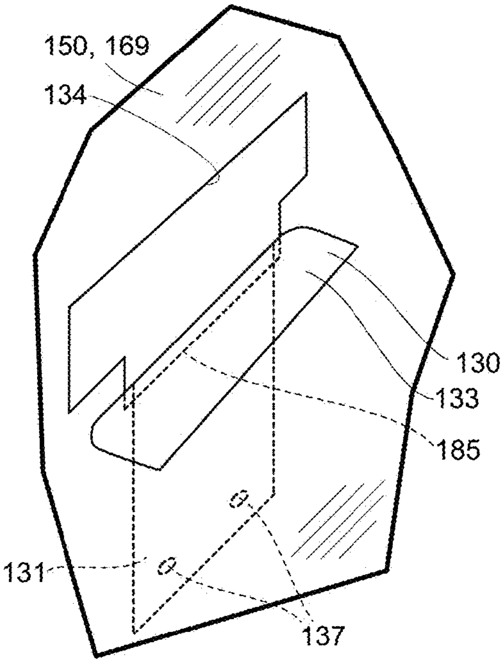

FIGS. 6A and 6B depict the interaction of the first engaging element 130 with the wall material 169 of the frame 150 around the opening 134 of the first edge 156A of the recess 155 of the component chassis 110 (not shown). In FIG. 6A, the rigid structure 131 of the first engaging element 130 rests on the lower edge 185 of the T-shaped opening 134. The rigid structure 131 is connected to the component chassis 110 (not shown) by connections 137 that may be screws, welds, adhesive material, hook and loop connectors, etc. Descending or projecting out of the plane of the rigid structure 131 (e.g., projecting normal to or otherwise out of the plane of the rigid structure 131) is the catch element 133 which has a width $W_3$ that is wider than the width $W_2$ of the lower portion 183 of the opening 134 but less wide than the width $W_1$ of the upper portion 181 of the opening 134, making it mechanically locked to prevent withdrawal from the opening 134 unless the catch element 133 is raised sufficiently to clear the lower portion 183 of the opening so that it can pass through the upper portion 181 of the opening 134.

In FIG. 6B, the elements of FIG. 6A are shown in a new relationship after the component chassis 110 (not shown) has been rotated 90 degrees relative to the wall material 169 of the frame 150, with the first engaging element 130 acting to hold the component chassis 110 to the frame 150. Now the catch element 133 extends normal to the place of the opening 134 as the rigid structure 131 extends downward. The catch element 133 still cannot be freed from the obstruction of the wall material 169 of the frame 150 because of steric hindrance, as the mechanical interlock defined by the geometry of the first engaging element 130 and the wall material 169 of the frame 150 prevents removal or dislodging of the first engaging element 130 from the frame 150 unless the catch element 133 is raised to reach the upper portion 181 of the opening 134 to allow it to pass through the opening 134.

Figure 7:
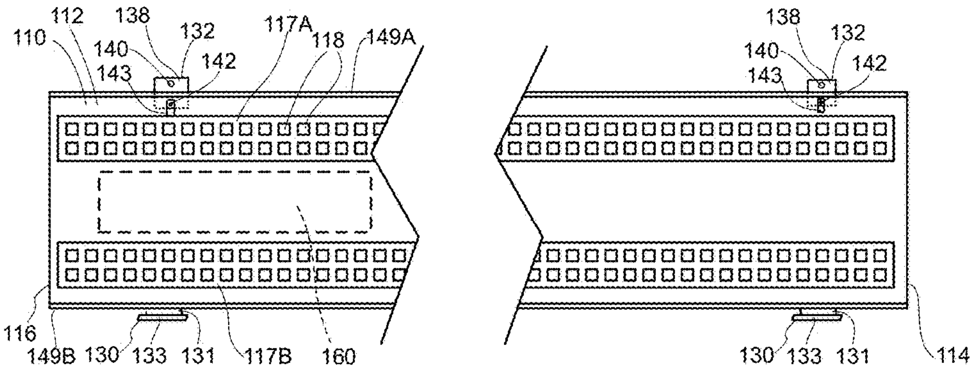
FIG. 7 depicts the front side of a component chassis showing the first engaging elements and the second engaging elements on opposing sides of the component chassis.

FIG. 7 depicts a front view of one aspect of a component chassis 110 showing two LED strips 117A, 117B. The component chassis 110 has a first end 114 and an opposing second end 116, and two opposing lateral sides or edges, a first edge 149A and a second edge 149B. The first edge 149A has two first engaging elements 130 projecting therefrom, each with a rigid structure 131 and a catch element 133, though other static or movable attachment units could be used instead. The second edge 149B as depicted holds two second engaging elements 132, each with a movable plate 138, a pin 142 for moving the movable plate 138, a pin 140 (a connector which can be a bolt, screw, pin, curved or bent element projecting from the movable plate 138, etc.) for connecting with or catching on the wall material 169 (not shown) around the second opening 134B of the frame 150 (not shown) by, for example, a mechanical interlock or steric hindrance.

Figure 8:
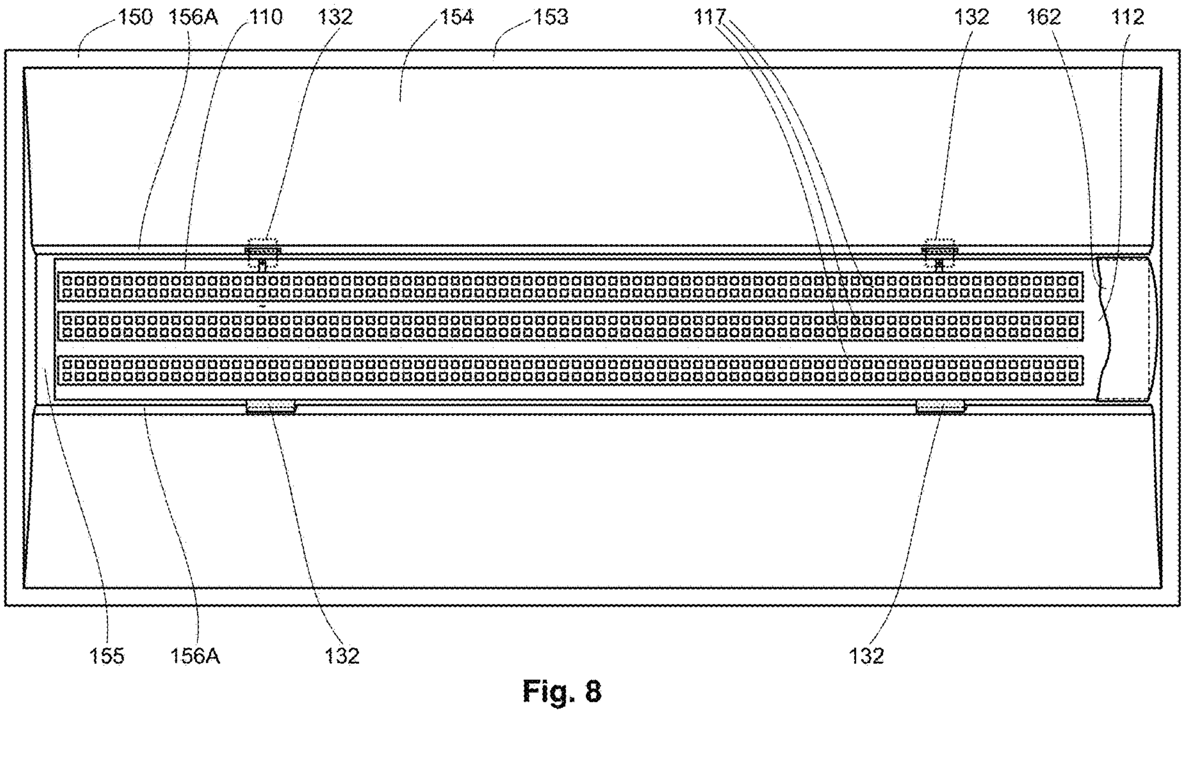
FIG. 8 depicts the front view of a LED luminaire with the component chassis fully attached to the frame and in the plane of the frame.

FIG. 8 depicts a component chassis 110 when fully connected to the frame 150, held securely in place by first engaging elements 130 and opposing second engaging elements 132. A portion of the lens 162 is shown over the component chassis 110. In this aspect of a component chassis 110, three LED strips 117 are shown.

FIGS. 9A-F show several aspects of a cross-section of the rigid structure 131 and the catch element 133 of a first engaging element 130 that have shapes from a side perspective other than a simple L-shape. In each figure, the rigid structure 131 appears linear, but it may be curved, stepped, zig-zag, or have other shapes from this perspective. In FIG. 9A, the catch element 133 resembles a inverted U with rectilinear strokes. In FIG. 9B, the catch element 133 resembles a rod with a circular cross section, though other cross sections may be used such as a rectangle or other suitable shape. In FIG. 9C, the end of the rigid structure 133 bends to form a hook shape or curved lip. In FIG. 9D, the bent end of the rigid structure 131 forms an acute angle L-shape to serve as the catch element 133. In FIG. 9E, the catch element 133 is depicted as a rod with a slot to receive the rigid structure 131, though it may be simply welded or otherwise attached to the rigid structure 131. In this case, there is not an acute angle or ledge to catch the edge of an opening (not shown), but the catch element 133 can nevertheless serve to form a mechanical interlock with a suitable opening 134 (not shown) in the frame 150 (not shown). FIG. 9F depicts a catch element 133 that appears indistinguishable from the linear rigid structure 131, but nevertheless may have a geometry that forms a mechanical interlock with the frame 150 (not shown) that may be evidence when viewed from a different perspective, as shown in FIGS. 10A-C.

FIGS. 10A-C show T-shaped first engaging elements 130 (or, in some aspects, these could also serve as components of second engaging elements 132) viewed from the front side, normal to the perspective shown in FIGS. 9A-F. In FIG. 10A the rigid structure 131 is joined to a catch element 133 in the form of a cross bar that could, for example, correspond to the catch elements shown in FIGS. 9A-D and have an outline consistent with the first engaging element 130 of FIG. 9E. FIG. 10B has a rigid structure 131 that flares outward in width near the top where the drawing could correspond to a bend in the upper portion of the rigid structure 131 to provide a cross-section from a side perspective similar to those of FIGS. 9B-D. FIG. 10C shows a first engaging element 130 with a rigid structure 131 that expands laterally near the top to form a catch element 133 resembling the cross stroke of a T. This shape could correspond, for example, to that of FIG. 9F or FIG. 9B.

FIG. 11 shows the mechanical interlocking performance of a first engaging element 130 with the wall material 169 of the frame 150 surrounding an opening 134. Here the first engaging element 130 has a catch element 133 in the form of a cylindrical rod attached to the rigid structure 131 and resembles that of the first engaging element 130 of FIG. 9B, though it could also resemble that of FIG. 9E. The first engaging element 130 is shown in a descending position, corresponding with an open component chassis 110 (not shown) in which the first engaging element 130 continues to hold the component chassis 110 securely in place with respect to the frame 150 after the second engaging elements 132 (not shown) have been disconnected from the frame 150, allowing the component chassis 110 to rotate or move with respect to the frame, such as being oriented vertically from a horizontal oriented frame 150 as one or more first engaging elements 130 maintain connection of the rotated component chassis 110 (not shown) with the frame 150. Also shown are connections 137 for connecting the rigid structure 131 of the first engaging element 130 with the component chassis 110 (not shown).

Figure 12:
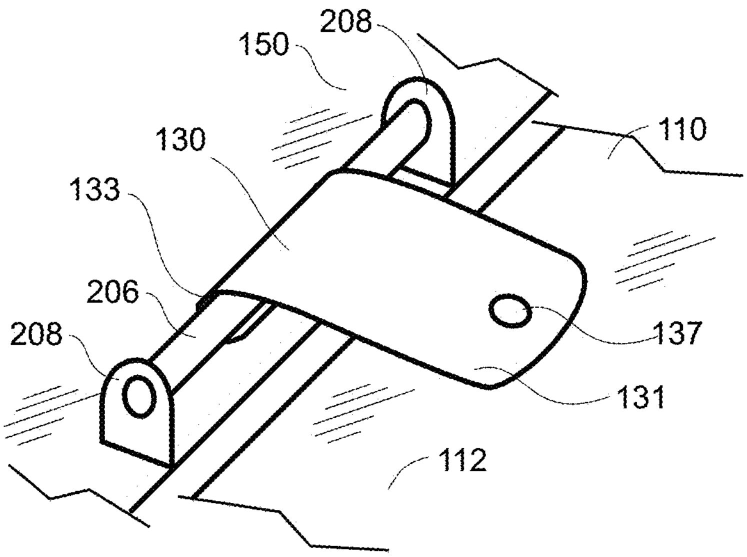
FIG. 12 depicts another form of an engaging element that can be rotated from a first to a second position.

FIG. 12 another form of a first engaging element 130 that can be rotated from a first to a second orientation. Here a portion of the frame 150 is shown, but not the walls of the recess 155 which need not be present in this case, for the first engaging element 130 connects not with the material of a wall (not shown) surrounding an opening (not shown), but directly with a support element 206 which may be a rod or beam, as shown, supported by supports 208 attached to the frame 150. The first engaging element 130 is attached to the substrate 112 with a connection 137 and connects to the support element 206 with a catch element 133 which in this case engages with the support element 206 in a rotatable relationship such that the component chassis 110 can swing or rotate from the first position currently shown (horizontal) to across a significant angle of rotation to a second position (not shown) that may differ from the first position by about 90 degrees, for example, such that the second position can be substantially vertical in this case. The catch element 133 can take many shapes and could be a cylinder that engages with the support element 206 when an end thereof is opened to make the connection. The rigid structure 131 could also be replaced with a deformable or flexible material (not shown).

Figure 13:
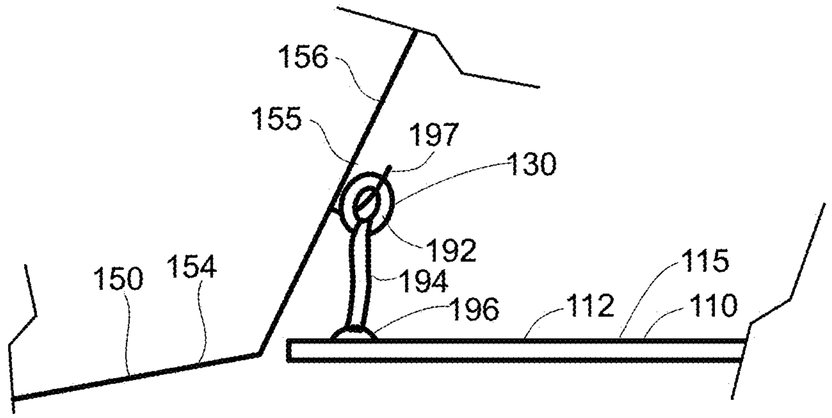
FIG. 13 depicts another form of an engaging element joining the component chassis to a frame in a rotatable and flexible relationship.

FIG. 13 shows a cross-sectional view of a portion of a frame 150 showing the sloped reflector region 154 and the edge 156 of the recess 155 in the frame 150. Extending from the edge 156 of the recess 155 is a hook 197 (alternatively, a protrusion, a handing element, a finger, etc.) adapted to engage with a first engaging element 130 on a component chassis 110, but for simplicity not showing the electronic components such as the LED driver 160 (not shown) on the back side 115 of the component chassis 110 or the substrate 112. Here the first engaging element 130 comprises a ring 192 (alternatively a loop, hook, etc.) attached to a flexible band or cable 194 which is secured to the substrate 112 by an anchor 196.

Alternatively and not as shown in the drawing, the flexible band or cable 194 with its ring 192 could be attached to the frame 150 and the hook 197 currently shown attached to the frame 150 could likewise be attached to the component chassis 110 to serve as the first engaging element 130 adapted to engage with the frame 150 via the ring 192, a reverse of the configuration shown in the FIG. 13. In either case, a first engaging element 130 attached to the component chassis 110 is adapted to connect with the frame 150 and to maintain its connection with the frame 150 as the component chassis 110 is rotated away from the horizontal position shown (after the one or more second engaging elements 132, not shown, are disconnected from the frame 150) to a second position such as a vertical position suspended securely from the frame 150, thereby providing ready access to the back side 115 of the substrate 112.

Figure 14:
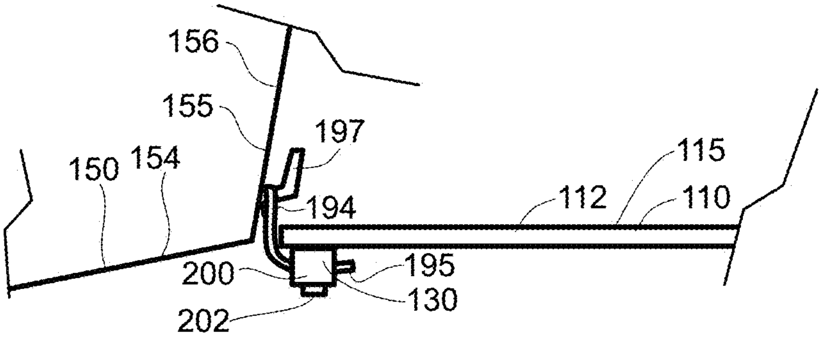
FIG. 14 depicts yet another form of an engaging element joining the component chassis to a frame in a rotatable and flexible relationship.

FIG. 14 depicts another form of a first engaging element 130 joining a component chassis 110 to the frame 150 in a rotatable and flexible relationship. Here a hook 197 protrudes from the frame 150, and in this aspect protrudes from the edge 156 of the recess 155 of the frame 150. A flexible band or cable 194 loops around or otherwise engages the hook 197 (i.e., it may form a loop or comprise a ring or hook 197, not shown). Rather than connecting to the back side 115 of the component chassis 110 as in FIG. 13, the first engaging element 130 attaches to the front side 113 of the component chassis 110 or the substrate 112, where a cord lock 200 (alternatively a cable stopper, toggle stopper, sliding clamp, wire rope clamp, or spring stop) may be employed, for example, to adjustably secure the flexible band or cable 194. If the connection needs to be tightened or loosened, the stop 202 can be depressed which can release a spring-loaded catch or grip in the cord lock 200 and allow the flexible band or cable 194 to be moved relative to the cord lock 200, as needed, such as by grasping its end 195 and pulling it to tighten the connection between the component chassis 110 and the frame 150. When the flexible band or cable 194 is properly positioned, the position of the component chassis 110 can correct relative to the frame, and, when the second engaging elements 132 (not shown) are released, the component chassis 110 can rotate or swing such that the component chassis 110 is suspended only by the first engaging element 130 (or elements) as it hangs in what may be a substantially vertical orientation when the frame 150 is mounted horizontally, as in the case shown, thereby making the back side 115 of the component chassis 110 more readily accessible to a technician positioned beneath the component chassis 110. When the component chassis 110 needs to be entirely removed after being opened (moved to the substantially vertical orientation), the first engaging element 130 (or elements) may simply be lifted to take the flexible band or cable 194 off the hook.

Figure 15A:
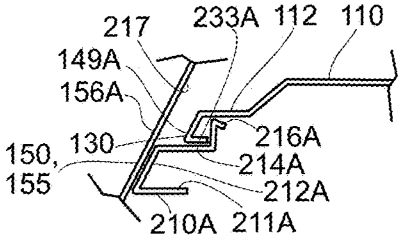
FIGS. 15A and 15B depict an aspect of a first engaging element interacting with a frame having a rail member.
Figure 15B:
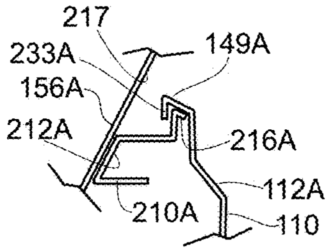

FIGS. 15A and 15B depict a partial view of a cross-section of a frame 150 and component chassis 110 with an alternate form of the first engaging element 130 that no longer requires a first opening 134A (not shown) in the first edge 156A of the recess 155 of the frame 150 (though one can be present if desired), but instead can engage with a first rail member 210A that is mounted on the inner surface 217 of the recess 155 of the frame 150 The first rail member 210A may extend along much or all of the length of the frame, or be relatively short, having a length (normal to the plane of FIG. 5A) of, say, from 1 to 10 inches, or from 2% to 20% of the length of the frame. The first rail member 210A defines a channel 212A having a bottom surface 211A and a top surface 214A which can be adapted to receive the lens 162 (not shown) instead of attaching to a channel on the component chassis 110. The component chassis 110 has a first edge 149A that now serves as a first engaging element 130 with a catch element 233A that is adapted to catch against a raised element 216A that extends upwards from the top surface 214A of the channel 212A. The raised element 216A may have an L-shape or an acute-angle L-shape as shown, though the L is inverted in this orientation. The foot of the L in this orientation slopes downwards slightly, though it can be substantially horizontal. The components of the component chassis 110 such as the LED driver 160 (not shown) are not shown for simplicity in this figure.

FIG. 15B shows how the first engaging element 130 of FIG. 15B can continue to hold the component chassis 110 in place against the frame 150 when the component chassis 110 has been rotated with respect to the frame 150 by about 90 degrees. Now the catch element 233A continues to engage with the raised element 216A, though now the foot of the L-shaped raised element 216A is nestled against the catch element 233A. The geometry of the first engaging element 130 and the first rail member 210A create a secure connection in either orientation, making it possible to rotate the component chassis 110 while it remains connected to the frame 150 such that work or treatments can be performed on either side of the component chassis conveniently, as needed, or such that it can be easily installed, removed, or replaced. The geometry of both the first rail member 210A, its opposing second rail member 210B (not shown), and the first engaging element 130 including the catch element 233 of the first edge 149A of the component chassis 110 can take a wide range of forms to achieve the same geometrical objectives, with a mechanical interlock holding the component chassis 110 in place against the frame 150 over divergent orientations (e.g., horizontal and vertical, or rotation over at least 25, 30, 45, or 50 degrees). The mechanical interlock may comprise a catch element 233 that engages with a surface of a rail, a hook, an opening, etc., and when a first rail member 210A is used as shown. It can be angular, curved, etc.

Figure 16:
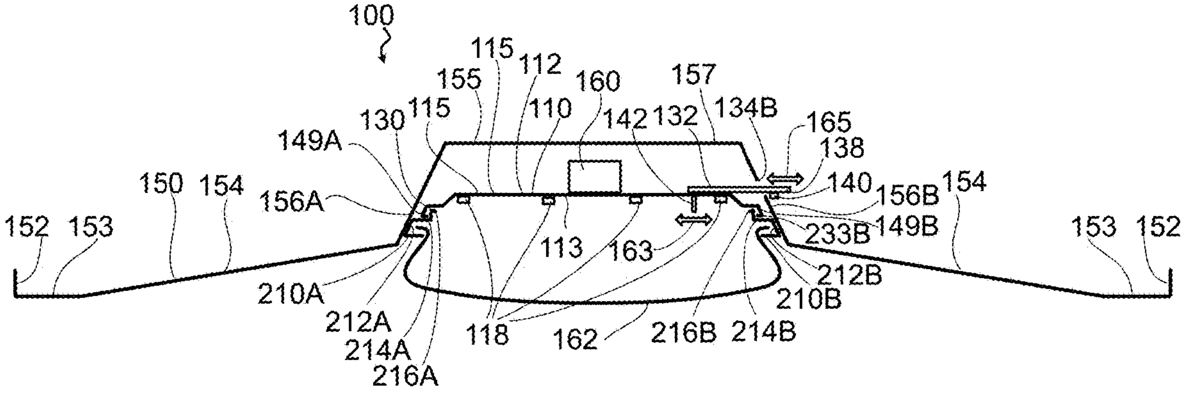
FIG. 16 depicts a cross-section of an LED luminaire with the component chassis in a closed position and connected to a frame with a first engaging element similar to that of FIGS. 15A and 15B engaged with a rail member on the frame.

FIG. 16 shows a cross-section of an LED luminaire 100 showing the first engaging element 130 of FIG. 15A with it catch element 233A that engages with a first rail member 210A. An opposing second rail member 210B provides a mirror image structure relative to the first rail member 210A as shown, but can be substantially different in shape and size if desired. Here the second rail member 210A serves as a ledge upon which second edge 149B of the component chassis 110 can sit, with full engagement to the second edge 156B of the recess 155 of the frame 150 being made by the slidable second engaging element 132 that engages with the second opening 134B of the recess 155. But if desired, the slidable second engaging element 132 as shown could be removed and engagement could be provided on the second side 149B of the component chassis 110 to the frame 150 by other means such as by magnets such as opposing magnets (not shown) mounted on the frame 150 and the second edge 149B of the component chassis 110, or by latches, snaps, locks, etc., or by the engagement as shown of the second edge 149B of the component chassis 110, in which case the second rail members 210B and the catch element 233 of the second edge 149B of the component chassis 110 could interact to hold the component chassis 110 in place, and in such a configuration, one could choose either side of the component chassis 110 to remain in place via mechanical engagement with the first or second rail member 210A, 210B while the opposing side of the component chassis 110 could rotate away from the frame 150.

In some aspects. The first rail member 210A and the second rail member 210B could be a separately manufactured rail that is secured by welding, screws, adhesives, or other means to the frame 150. In other aspects, it could be formed with the frame 150 during manufacturing. For example, a plastic frame 150 could be formed by injection molding with the structure of the first and second rail members 210A, 210B formed simultaneously and unitary with or integral with the frame 150.

Figure 17:
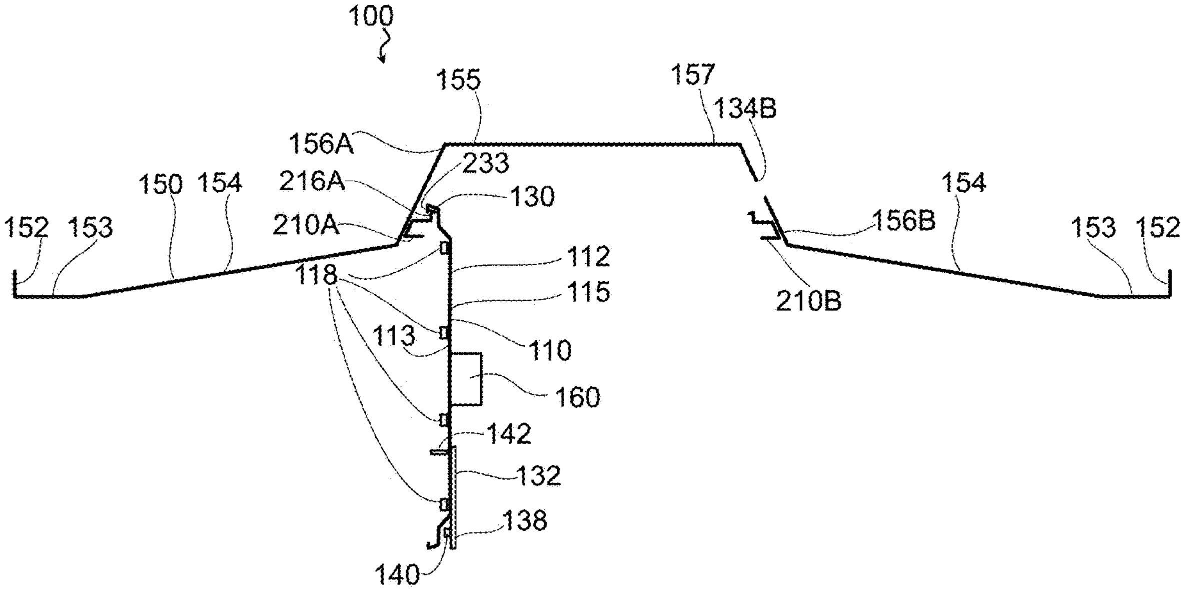
FIG. 17 shows the cross-section of the LED luminaire of FIG. 16 with the lens removed and the component chassis rotated to an open position.

FIG. 17 shows the LED luminaire 100 of FIG. 16, but with the component chassis 110 in an “open” position with the back side 115 of the component chassis 110 now accessible for treatment, having been rotated relative to the plane of the frame 150 by about 90 degrees as it remains suspended and connected to the frame 150 via the first engaging element 130 whose catch element 133 securely connects (snags or hooks onto) the material of the first edge 156A of the recess 155 of the frame 150 around a first opening 134A in the frame 150.

Figure 18A:
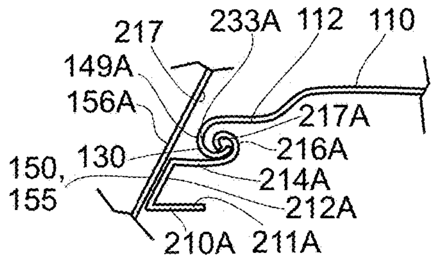
FIGS. 18A and 18B depict another aspect of a first engaging element interacting with a frame having a rail member, in which both the first engaging element and the rail member have curved lips that interact to allow the component chassis to rotate between two positions.
Figure 18B:
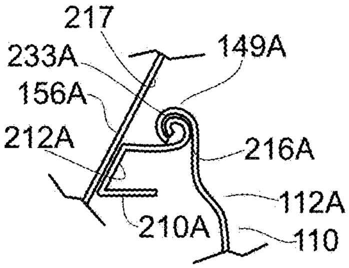

FIGS. 18A and 18B are similar to FIGS. 15A and 15B, except that the raised element 216A that extends upwards from the top surface 214A of the channel 212A of the first rail member 210A does not terminate with an acute-angled L-shape facing toward the interior of the recess 155 as in FIGS. 15A and 15B, but ends terminates in a curled lip 217A that curls or curves away from the interior of the recess 155 but toward the adjacent first edge 156A of the recess. This curled lip 217A is adapted to engage with the catch element 133 of the first engaging element 130 of the component chassis 110, which in this aspect is also a curled lip. The interaction of the curled lip 217A of the first rail member 210A with the curled catch element 133 of the first engaging element 130 not only forms a good connection along the first rail member 210A, but allows the component chassis 110 to smoothly rotate about the first rail member 210A, as shown in FIG. 18B, to provide access to both sides of the component chassis 110 as the component chassis 110 remains securely attached to the frame 150.

In some aspects, the interaction of opposing curled lips or more generally, the interaction of catch elements 133 that snugly engage with opposing surfaces of the frame 150 can, when they extend across a substantial length of the frame 150, be useful in reducing the migration of insects from above the LED luminaire 100 (not shown) into the lens 162 (not shown), where they may die and be visible. This can be particularly effective if weather strip material (not shown) or other resilient members (not shown) are provided on the ends of the component chassis 110 (not shown) or wherever there may be access for insects to seal insects out of the region between the component chassis 110 and the lens 162 (not shown), and in some aspects, the lighting systems described herein may be adapted with such protective material that, when coupled with good engagement between the frame 150 and the catch element 133 or other structures shown herein, may result in reduced problems with insects reaching the lens 162 (not shown).

Figure 19A:
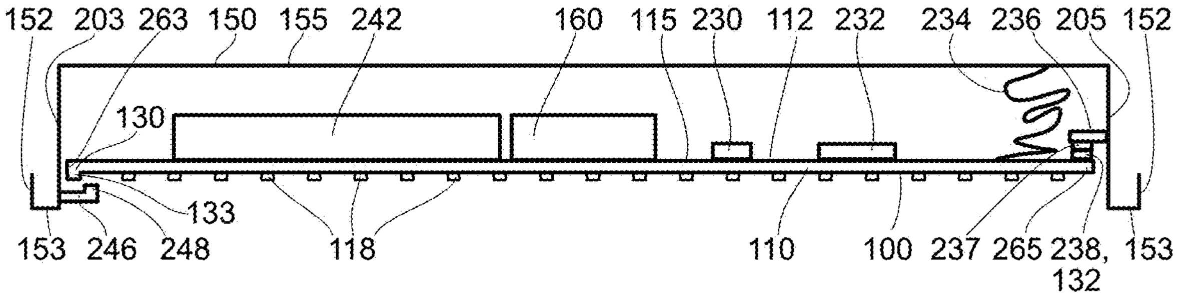
FIGS. 19A and 19B depict a longitudinal cross-section of one aspect of an LED luminaire, showing open and closed positions of a component chassis.
Figure 19B:
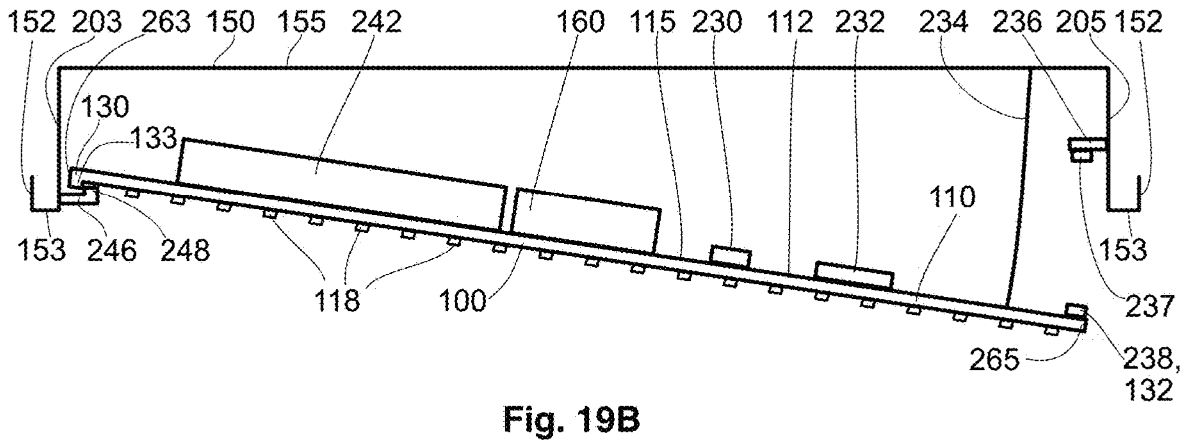

FIGS. 19A and 19B show a cross-sectional view of an LED luminaire 100 taken lengthwise along a central longitudinal axis across the recess 155 of the frame, from a first end 203 to a second end 205 of the recess 155 of the frame 150, showing also the component chassis 110 with its first end 263 and second end 265. The component chassis 110 is in a "closed" position in the plane of the frame 150 and attached thereto. The first end 263 of the component chassis 110 serves as a first engaging element 130, having a catch element 133 in the form of a lip descending from the substrate 112, adapted to engage with a support member 246 such as a ledge or rail extending from the first end 203 of the recess 155 of the frame 150 on the internal side of the frame 150. Here the support member 246 is depicted as a ledge having a raised lip 248 which can engage with the catch element 133 of the first engaging element 130 to restrain the component chassis 100 and keep it from sliding off the support member 246. Alternatively, the lip 248 could be more complex, such as a concave or curled lip as shown in FIGS. 18A and 18B, wherein the catch element 133 is a curled lip that effectively engages with the (curled) lip 248 of the support member 246. Such interaction could support rotation of the component chassis 110 relative to the frame 150 of about 90 degrees, but as shown here and in FIG. 19B, a smaller angle is considered which is constrained by a support cable 234 that is attached to the upper surface of the recess 155 and connected to the component chassis 110 near the second end 265 of the component chassis 110. The extend of rotation is shown in FIG. 19B, where it is enough to provide access to the back side 115 of the component chassis, such as from about 15 degrees to 45 degrees relative to the plane of the frame 150.

The cable 234 can hold the component chassis 110 in the "open" position, at an angle greater of 10 degrees or more, 15 degrees or more, 20 degrees or more, 30 degrees or more, etc., relative to the first orientation and typically relative to the frame 150. Holding the component chassis 110 in this position can, in some aspects, be done without the need for any external support such as a human hand holding the component chassis or an object such as a ladder, pole, duct tape, etc., propping up or restraining the component chassis 110. The second orientation ("open" position) can, in many aspects, be maintained solely by the interaction of the first engaging element 130 with the frame 150, or by such interaction further aided by one or more cables 234 joining the component chassis to the frame 150 and thereby constraining the movement of the component chassis 110.

The connection of the second end 265 of the component chassis to the second end 205 of the frame 150 is achieved magnetically. Thus, the second engaging element 132 comprises a magnet 238 on the back side 115 of the component chassis 110 that engages with a magnet 237 attached to a support member 236 extending from the second end 205 of the recess 155 of the frame. When the two magnets 237, 238 are brought near each other, they can connect securely.

The connection of the cable 234 to the frame 150 may employ a Gripple toggle hanger or aircraft cable hanger, a snap-on connection, and eyelet screwed or welded onto the frame 150, or any other connection. It may also be welded to the substrate 112 of the component chassis 110 or attached in any other suitable way. More than one cable 234 may be used, if desired, and the cable 234 may be made of any suitable material such as chain links, wire, steel cable, polymeric cord, rope, string, etc.

Further Technical Considerations

Control systems use in association with the LED luminaires described herein may be responsive to conditions of ambient light. As used herein, "ambient light" refers to visible radiation (light whose wavelength is between about 450 nm and about 700 nm) that pervades an environment or space. It is the indirect light that fills a local environment and is perceptible to people in the environment. Likewise, "ambient light level" refers to the illuminance, or luminous flux on a surface per unit area. The illuminance is a measure of how much the incident light illuminates the surface and may be measured in lux (lumens per square meter) or foot-candles.

Control systems can include controls for the brightness of individual LED lights. Brightness can be controlled with variable voltage, such as the use of a voltage adjusting block (VAB) as described in U.S. Pat. No. 10,743,385, "Adjustable voltage constant current light emitting diode (LED) driver for automotive headlights," or with Pulse Width Modulation (PWM) or other known methods. PWM dimming, for example, changes the light output by varying the duty cycle of a constant current in the string of lights to change the average current, in effect, and thus affect the brightness of the perceived light. Examples of commercial LED control systems include the products of Avi-on Products (Park City, UT). Such controls may be operated by BlueTooth or other wireless methods to control the LED driver and other aspects of the LED luminaire according to manual input, programmed settings, etc., in response to changing needs or environment factor or data from various sensors. Control systems may be part of a network, etc.

An LED light may operate with a forward voltage within any practical range, such as in the range of 3.0 to 3.5V, and may operate with forward current of any suitable value such as at about 350 mA, 700 mA, or 1050 mA, and may have a corresponding power rating of, say, 1, 2, or 3 Watts.

LED drivers may be constant current drivers, constant voltage drivers, or hybrid drivers, for example. LED drivers may include any driver that can be attached to a component chassis as described herein. For example, commercial LED drivers may include those marketed by such companies as Signify (Eindhoven, Netherlands), formerly known as Philips Lighting, Mean Well (New Taipei City, Taiwan), Tridonic (Dornbirn, Austria), OSRAM (Munich, Germany), Lutron Electronics (Coopersburg, PA), Acuity Brands (Atlanta, GA), Inventronics (Hangzhou, China). LED drivers may employ pulse width modulation (PWM) as a control strategy to control an array of LED cells, or may employ analog dimming, digital dimming, or other methods.

Electrical Connectors

A wide variety of electrical connectors may be considered for various connections in the LED luminaire, such as wire-to-wire connectors, wire-to-board connectors, and board-to-board connectors. Electrical connectors that may be used include any suitable NEMA connector, including twist-lock connectors such as NEMA L6 (e.g., L6-20P) or L15 (e.g., L15-30P) connectors. See, for example, https://en.wikipedia.org/wiki/NEMA_connector. Suitable connectors may also be selected from the connection products of companies such as Wago, Molex, TE Connectivity, Amphenol, Hirose Electric, Phoenix Contact, etc.

Connectors for a PCB board that may be part of the substrate or otherwise in electrical communication with the LED lights and LED driver may be of any suitable form, such as rail mount plugs, harness style plus, angled connectors, direct marking connectors, etc. The "Direct marking" connectors are designed to work with pre-printed wire markers, which can be inserted directly into the connector housing to provide identification of the individual wires.

Many examples of suitable connectors are shown, for example, in the catalog of Wago GmbH (Minden, Germany), *WAGO PCB Terminal Block and Connectors Full Line Catalog*, vol. 2, edition 2021/2022, at https://store-hf5p6bxj3i.mybigcommerce.com/content/wago/catalogs/wago-Full-Line-Catalog-Volume-2-PCB.pdf. Exemplary connections include the 1-conductor female plug MCS MIDI, 722 Series, p. 466, 721 Series, p. 509, and 231 Series, p. 560; 1-conductor male connector MCS MIDI, 721 Series, p. 478; female connector for rail-mount terminal blocks, 722 Series, p. 498; THT male header (harness style), 721 Series, p. 534; Direct Marking MCS MIDI and MCS MIDI Classic male and female connectors, p. 548; THT male header for double-deck assembly, 232 Series, p. 590; PCB connectors and headers, MCS MIDI Classic style, as shown on p. 743, including 1) male headers with angled solder pins, male headers for double-deck assembly, angled female connectors with conductor entry opposite of latches and angled female connector with conductor entry in the same direction as latches; exemplary arrangements as shown on p. 751; 1-conductor female plug, MCS MAXI 16, with level actuation and a push-in Cage Clamp, 832 Series, p. 768; feedthrough terminal blocks, 231, 731 and 226 Series, p. 801; and feedthrough terminal block, 828 Series with CAGE CLAMP® lever mounting actuation and locking claw, 16 square millimeters, and 11.5 mm pin spacing, p. 817. All examples are non-limiting.

In one aspect, connectors are used that can permit the LED component chassis to be removed and installed under full electrical load, such that power does not need to be cut prior to mating and unmating of the connectors that provide power to the LEC component chassis from the power source. Suitable connectors for this purpose include Wago Winstra conectors, including those described at https://www.wago-.com/us/discover-pluggable-connectors/winsta. Latching and non-latching connectors may be used, though in some aspects non-latching may be helpful.

Further Aspects

In a first aspect, an LED luminaire includes an LED component chassis having a front side and a back side with one or more LED lights on the front side and an LED driver on the back side, the LED luminaire further including a frame having a recess for receiving the LED component chassis, wherein the recess includes a first side adapted to connect to one or more first engaging elements on a first side of the component chassis and a second surface adapted to connect to one or more second engaging elements on the component chassis, wherein the component chassis is in a first orientation when both the one or more first engaging elements and the one or more second engaging elements are connected to the frame, and wherein the one or more first engaging elements are adapted to hold the component chassis in contact with the frame when the component chassis is in a second position relative to the frame with the one or more second engaging elements disconnected and remote from the frame, such that the back of the component chassis is accessible.

In a second aspect, the one or more first engaging elements of the LED luminaire of Aspect 1 are multi-part elements such that a first part of the one or more first engaging elements connects with the frame when the component chassis is in the first orientation and a second part of the one or more first engaging elements is in contact with the frame when the component chassis is in the second orientation.

In a third aspect, the one or more first engaging elements of the component chassis of the LED luminaire of Aspects 1 or 2 comprise a catch element that remains in contact with the frame as the component chassis rotates from the first orientation to the second orientation, wherein the angle between the first orientation and the second orientation is at least 10 degrees, and wherein the second orientation can be maintained without the need for external support. External support refers to support systems that are not a part of the luminaire, such as a human hand, a ladder propping up the component chassis, duct tape, etc. In other words, the second orientation (when the chassis is in a relatively open position that provides access to the back side of the component chassis for treatment of various kinds) can be maintained at an angle relative to the frame without the need for (1) additional support apart from the contact of the one or more first engaging elements with the frame or (2) without the need for additional support other than a cable remote from the one or more first engaging elements joining the component chassis to the frame. The second case can be considered, for example, in light of the aspects shown in FIGS. 19A and 19B, with a cable 234 joining the recess 155 of the frame 150 to the back side 115 of the component chassis 110 near the second end 265 of the component chassis 110. Note that with the use of a cable 234 or related devices joining the frame 150 to the component chassis 110, whether it is remote from the one or more second engaging elements 132 or connected thereto, when one side or edge of component chassis 110 has been moved substantially away from the frame 150 to provide access to the back side 115 of the component chassis 110, the one or more second engaging elements 132 are considered to be disconnected, even if a cable, rubber band, or other flexible or extensible tether or other member technically remains connected to both the frame 150 and the component chassis 110. In typical aspects, an "open" orientation of the component chassis 110, distinct from its normal "closed" orientation, indicates that a degree of disconnection between the frame 150 and the component chassis 110 has taken place to make such manipulation of the component chassis 110 possible, and this the one or more second engaging elements 132 in such cases will be considered to have been disconnected.

In a fourth aspect, the one or more first engaging elements of the LED luminaire of any of the preceding aspects comprise a structure having a catch element that is adapted to connect to the frame while the component chassis is in either the first or second orientation.

In a fifth aspect, the component chassis of the LED luminaire of any of the preceding aspects when in the second orientation is at an angle to the plane of the component chassis when it is in the first orientation, wherein the angle is from 20 to 135 degrees, or from 30 to 120 degrees or from 45 to 120 degrees, such as from about 60 to 110 degrees, or from 70 to 110 degrees.

In a sixth aspect, an LED luminaire comprises an LED component chassis having one or more LED lights, an LED driver, and a power receptacle for connecting to a power source, the LED luminaire further including a frame having a recess for receiving the LED component chassis, wherein the recess has a first side with one or more openings for receiving one or more first engaging elements from a first side of the component chassis and a surface remote from the first edge of the recess adapted to removably secure a second side of the component chassis with one or more second engaging elements, wherein the component chassis is in a first orientation when it is secured to the frame by both the one or more first engaging elements and the one or more second engaging elements, wherein the one or more first engaging elements are adapted to hold the component chassis in contact with the frame when the component chassis is in a second orientation such that the second side of the component chassis is remote from the frame.

In a seventh aspect, the LED luminaire of any of the previous aspects is provided, wherein the one or more first engaging elements comprise a rigid structure extending from the component chassis.

In an eighth aspect, the LED luminaire of any of the previous aspects is provided, wherein the one or more first engaging elements comprise a rigid structure extending from the component chassis, which, when viewed from a first perspective, has a T-shaped structure having an upper beam and a lower leg, and wherein the one or more openings of the first side of the recess of the frame has a relatively broader portion and a relatively narrower portion adapted to cooperate with the T-shaped structure of the rigid connector.

In an ninth aspect, the LED luminaire of Aspect 8 is provided, wherein the upper beam of the T-shaped structure projects out of the plane of the lower leg to form an acute angle or curved element adapted to serve as a catch element to hold the component chassis in contact with the frame when the component chassis is rotated with respect to the frame such that the one or more second engaging elements are remote from the frame.

In a tenth aspect, the LED luminaire of any of the preceding aspects is provided, wherein the one or more first engaging elements employ mechanical interlocking to connect to the frame through cooperation with one or more openings of the recess of the frame.

In an eleventh aspect, the LED luminaire of any of the preceding aspects is provided, wherein the one or more first engaging elements comprise an acute angle connector.

In a twelfth aspect, the LED luminaire of any of the preceding aspects is provided, wherein the one or more second engaging elements are one or more movable engaging elements.

In a thirteenth aspect, the LED luminaire of Aspect 11 is provided, wherein the one or more movable engaging elements are selected from the group consisting of a sliding lock, a rotating hinge, a rotating latch, and a spring-loaded catch.

In a fourteenth aspect, the LED luminaire of any of the preceding aspects is provided, wherein the component chassis comprises opposing channels or grooves for receiving a lens.

In a fifteenth aspect, the LED luminaire of any of the preceding aspects is provided, wherein the one or more first engaging elements has a relatively narrow rigid structure attached to the component chassis and a relatively wider check element attached to the rigid structure remote from the component chassis.

In a sixteenth aspect, a method is provided for treating an LED luminaire, wherein the LED luminaire comprises an LED component chassis having a first side and an opposing second side, one or more LED lights, an LED driver, a power receptacle for connecting to a power source, a frame having a recess for receiving the LED component chassis, wherein the recess comprises one or more structures for receiving one or more first engaging elements from a first side of the component chassis and a surface remote from the first edge of the recess adapted to receive one or more second engaging elements to removably secure a second side of the component chassis with one or more second engaging elements, the method comprising disconnecting the one or more second engaging elements of the component chassis from the frame, moving the second side of the component chassis away from the frame after while the one or more first engaging elements are connected to the frame (in some aspects, they simply remain connected to the frame as the frame is rotated, though with a two-part first engaging element, the first part of the two-part first engaging element of the component chassis may first be separated from the frame and then the second part of the two-part first engaging element may then be connected to the frame to hold the frame securely in place for ease of treatment after the one or more second engaging elements have been disconnected) such that the component chassis becomes more accessible for treatment, and then treating the component chassis.

In a seventeenth aspect, the method of Aspect 16 is provided in which the frame is mounted to a ceiling and the component chassis, after its second side has been rotated away from the frame, is suspended from the frame in a substantially vertical orientation.

In an eighteenth aspect, the method of Aspects 16 or 17 is provided, wherein disconnecting the one or more second engaging elements of the component chassis from the frame includes moving one or more movable elements on the one or more second engaging elements.

In a nineteenth aspect, the method of any of the previous aspects is provided, wherein the one or more first engaging elements remain secured to the frame by a mechanical interlock when the second edge of the component chassis is rotated away from the frame.

In a twentieth aspect, the method of any of the previous aspects is provided, wherein the mechanical interlock comprises a first engaging element having a rigid structure connected to catch element, wherein the catch element is wider than the rigid structure.

In a twenty-first aspect, the method of any of the previous aspects is provided, wherein the at least one of the shape of the first openings in the recess of the frame and the one or more first engaging elements have shape in which the width of an upper portion is substantially greater than the width of a lower portion.

In a twenty-first aspect, the LED luminaire of any of claims 1 through 5 is provided, wherein the one or more first engaging elements comprise a flexible member that remains in contact with the frame as the component chassis rotates from the first orientation to the second orientation.

In some aspects, additional engaging elements may be considered such as any of the following: snap-fit connectors having a protrusion, tab, or clip that engages a corresponding recess, slot, or opening, resulting in a secure and releasable connection; ball and socket connectors having a component that snaps into a socket-shaped element on the other component; rail and groove systems with a linear rail or track on one component that engages a corresponding groove or channel on the other component, allowing the components to slide and lock into position; T-slot and tab connectors with one component that receives a complementary T-shaped tab or other shaped tab on the other component, with the tab sliding into the slot and locking into place; resilient tabs (e.g., made of metal or plastic) that fit in slots or other openings, including spring-loaded tabs that engage a corresponding opening to provide a secure and detachable connection, and locking tabs with a feature such as a protrusion or latch that engages with a corresponding slot on an opposing surface. Connections may also include a flexible tether or chain, a rotatable connection such as a hook or finger than rotates about a hook, loop, or fissure, etc. Magnetic attachment may also be possible using one or more magnets on the component chassis adapted to attach firmly to a steel or other suitable frame material. Hook and loop materials, often provided in the form of flexible tapes adhesively joined to opposing surfaces, may also be used to secure the LED component chassis to the frame. Further, one or more tethers may be provided join the LED component chassis to the frame, such as a length of flexible cord, chain, or wire that may be secured to the backside of the substrate and have a loop, ring, snap, or other attachment means to join to a portion of the frame.

In another aspect, an LED luminaire is provided comprising (1) a frame comprising a power receptacle and a connecting element remote from the receptacle; (2) an LED component chassis adapted to be attached or removed from the frame by hand without the need for tools, the LED component chassis comprising a substrate having a material such as aluminum with high thermal conductivity, an LED driver attached to the substrate, one or more LED lights attached to the substrate, two or more electrical prongs adapted to be received by the power receptacle of the frame, the prongs being in electrical communication with the driver and the one or more LED lights; (3) one or more sensors adapted to provide information which may be attached to the component chassis, and (4) a network communication device in communication with the one or more sensors and with one or more other network communication devices within a network, such that the information from the sensors can be shared with the network. The network communication device may be attached to the substrate and may be in electrical or electromagnetic communication with the driver.

In a related aspect, the LED driver is also responsive to commands provided through a network and can therefore control various aspects of the LED luminaire through communication from the network, including on/off state of the at least one LED light, brightness, color or optical temperature of the at least one LED light, etc. In related aspects, the sensors may comprise RFID sensors, motion detectors, accelerometers, photodetectors, cameras, microphones, noise sensors, electrical noise sensors, facial recognition sensors, other biometric sensors such as gait analyzers, etc., as well as chemical and particulate sensors (e.g., for monitoring air quality, pollutants, diesel fumes, $CO_2$ level, smoke, ionization, radiation, humidity, dust, etc.) and can send data obtained from such sensors to the network. The LED component chassis may also comprise or have access to a processor and memory comprising instructions and/or having the ability to store data.

The network may be largely or entirely formed by the interaction of a plurality of such LED luminaires, or may be integrated with a network comprising a wide variety of devices such as computers, cell phones, vehicles, etc., as well as smart devices including smart LED lights, etc. The network may be a mesh network, such as a partially connected mesh or fully connected mesh network. It can be a wireless mesh network or a wireless ad hoc network. Other network types may be implemented, such as parent-child (or worker-helper) networks, etc.

Such an LED luminaire can solve one or more practical problems in managing the lighting of a facility such as a warehouse, factory, retail store or mall, working environment such as an office building, healthcare environment such as a hospital, government facility, or numerous other indoor as well as some outdoor settings where electric lighting is needed. One such practical problem is the need to retrofit existing fluorescent lights with more efficient LED luminaires that also make it easy to later upgrade the LED luminaires to add new controls, sensors, wireless networking options, etc., when desired. While the initial retrofit may require turning off power and making modifications to the frame or connectors, as well as optional removal of the ballast, in some aspects the LED system, once installed, can be upgraded or repaired without the need to use tools or turn off the power. The systems and luminaires described herein can, in many aspects, be replaced or upgraded without turning off power or using tools. This can typically be achieved by simply removing one LED component chassis (disconnecting the connection to the live power line) and installing another. The power line that may be in the back of the component chassis can be disconnected as the component chassis hangs from its first side as it is joined by the one or more first engaging elements to the frame, and then it can be removed completely as a new component chassis is hung from the frame by its one or more first engaging elements, followed by connection to the live power line, selection of suitable settings if desired via switches on the component chassis, then raising the component chassis into place against the frame with the one or more first engaging elements attached to the frame and then connecting the one or more second engaging element by, for example, sliding a sliding member or rotating a rotating member to form a connection with the frame.

The LED luminaires described herein may solve another common problem in some aspects, namely, the need for a worker to ascend and descend repeatedly while changing multiple luminaires in order to obtain and use replacement parts. In some aspects, the LED component chassis may be adapted to fit into a troffer having planar dimensions of at least 30 cm by 60 cm, capable of providing at least 3,000, 4,000, 5,000, or 6,000 lumens, while weighing less than 3 kg, 2 kg, 1.5 kg, or 1 kg (excluding the lens for those cases in which the lens attaches to the LED component chassis and is thus considered part of the LED component chassis), and optionally having a thickness (excluding the lens) of less than 10 cm, 8 cm, 6 cm, or 4 cm. Such properties make it possible for a worker to ascend to a ceiling or to the location of a plurality of luminaires and to install a large number or new or modified component chassis using a single load of component chassis, such as 4, 6, 8, 10, 12, 14, or 16 or more component chassis that are brought with the worker upon ascending on a device or platform. The multiple component chassis may be a carried in a case, a backpack, a pouch, etc. The ascent device may be a ladder, an articulated boom lift, an aerial work platform (AWP), an elevating work platform (EWP), a cherry picker, a bucket truck, a mobile elevating work platform (MEWP), a scissors lift, a telescopic boom lift, etc. The ability to carry a large number of devices convenient in order to make changes, repairs, or upgrades to a plurality of luminaires conveniently greatly reduces the time required to modify a lighting system, especially when the worker does not need to use tools to dismantle a frame or access hard-to-reach components above a troffer or light panel. Such ease of access and change makes it commercially possible to quickly modify not just control systems and individual components, but to establish useful networks economically, with network nodes provided with the luminaires that are generally installed at regular intervals, giving a network with high visibility and good communication characteristics. The network may operate wirelessly, if desired, at any useful frequency such as UHF frequencies, Bluetooth frequencies, WIFI frequencies, etc.

In a related aspect, the component chassis may comprise processing and communication elements, such as a processor that implements instructions to control logic for operation of the luminaire and its associated equipment such as sensors, controls, and communication devices. The processor may be part of a microchip that also comprises a memory or has access to a memory or memories that may store instructions.

In another aspect, a method is provided for easily upgrading or repairing an existing LED luminaire installed in a frame. Upgrading may be done to provide added functionality such as adding or improving sensors, adding or improving network communication abilities such as WIFI or Bluetooth systems, upgrading the LED driver, or adding enhanced LED light panels, etc. Repairing may be done to replace one or more defective or damaged LED lights or light panels, or a defective driver, sensor, or other components. The method may be carried out without the need for tools (e.g., without the need to use a screwdriver, wrench, hammer, drill, pliers, wire cutter, etc.) and without the need to cut off systemwide power.

In another aspect, any of the previously mentioned aspects may be further limited, when suitable, by a reduction in noise during installation, such that Lpeak (the maximum instantaneous sound pressure) measured during installation is at least 3 decibels greater when steps (f) and (g) occur substantially simultaneously, when measured by the use of a suitable sound probe such as the Extech SL130 W Sound Level device held 10 inches below the fame and 10 inches to the side of the frame, facing the center of the luminaire, in an environment with suitably low background noise (e.g., less than 30 database).

In general, any limitation, element, feature, or step of any aspect or claim herein may be considered to be capable of being combined with any other limitation, element, feature, or step of any aspect or claim unless obviously impossible or deleterious, and such disclosure should be considered implicit if not already explicit.

Further Remarks

When introducing elements of aspects of the invention or the embodiments thereof, the articles "a," "an," "the," and "said" are intended to mean that there are one or more of the elements, and thus may include plural referents unless the context clearly dictates otherwise. The terms "comprising," "including," and "having" are intended to be inclusive and mean that there may be additional elements other than the listed elements.

As used herein, the word "exemplary" means serving as an example, instance, or illustration. The aspects described herein are not limiting but rather are exemplary only. It should be understood that the described aspects are not necessarily to be construed as preferred or advantageous over other aspects. Unless otherwise indicated, no aspect of any invention described herein should be assumed to have the same advantages or features had by any other aspect.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

Having described aspects of the invention in detail, it will be apparent that modifications and variations are possible without departing from the scope of aspects of the invention as defined in the appended claims. As various changes could be made in the above compositions, products, and methods without departing from the scope of aspects of the invention, it is intended that all matter contained in the above description shall be interpreted as illustrative and not in a limiting sense.

While the foregoing description makes reference to particular illustrative aspects, these examples should not be construed as limitations. The inventive system, methods, and products can be adapted for other uses or provided in other forms not explicitly listed above, and can be modified in numerous ways within the spirit of the present disclosure. Thus, the present invention is not limited to the disclosed aspects, but is to be accorded the widest scope consistent with the claims below.

The invention claimed is:

1. An LED luminaire comprising an LED component chassis having a front side and a back side comprising one or more LED lights on the front side and an LED driver on the back side, the LED luminaire further comprising a frame having a recess for receiving the LED component chassis, wherein the recess comprises a first side adapted to connect to one or more first engaging elements on a first side of the component chassis and a second side adapted to connect to one or more second engaging elements on the component chassis such that the component chassis is in a first orientation when both the one or more first engaging elements and the one or more second engaging elements are connected to the frame, and wherein the one or more first engaging elements are adapted to hold the component chassis in contact with the frame when the component chassis is in a second orientation relative to the frame with the one or more second engaging elements disconnected and remote from the frame, wherein the back side of the component chassis is accessible in the second orientation.

2. The LED luminaire of claim 1, wherein the one or more first engaging elements are two-part elements such that a first part of the one or more first engaging elements connects with the frame when the component chassis is in the first orientation and a second part of the one or more first engaging elements is in contact with the frame when the component chassis is in the second orientation.

3. The LED luminaire of claim 1, wherein the one or more first engaging elements comprise a catch element that remains in contact with the frame as the component chassis rotates from the first orientation to the second orientation, wherein the angle between the first orientation and the second orientation is at least 10 degrees, and wherein the second orientation can be maintained without the need for external support.

4. The LED luminaire of claim 1, wherein a rail member on the frame is adapted to receive the one or more first engaging elements of the component chassis, and wherein the one or more first engaging elements comprise a catch element that can hold the component chassis on the rail member.

5. The LED luminaire of claim 4 wherein the rail member further comprises a channel for receiving an edge of a lens.

6. The LED luminaire of claim 1, wherein the component chassis in the second orientation is at an angle to the plane of the component chassis in the first orientation, wherein the angle is from 20 to 135 degrees.

7. An LED luminaire comprising an LED component chassis comprising one or more LED lights, an LED driver, and a power receptacle for connecting to a power source, the LED luminaire further comprising a frame having a recess for receiving the LED component chassis, wherein the recess comprises a first side with one or more openings for receiving one or more first engaging elements from a first side of the component chassis and a surface remote from the first edge of the recess adapted to removably secure a second side of the component chassis with one or more second engaging elements, wherein the component chassis is in a first orientation when it is secured to the frame by both the one or more first engaging elements and the one or more second engaging elements, wherein the one or more first engaging elements are adapted to hold the component chassis in contact with the frame when the component chassis is in a second orientation such that the second side of the component chassis is remote from the frame.

8. The LED luminaire of claim 7, wherein the one or more first engaging elements comprise a rigid structure extending from the component chassis.

9. The LED luminaire of claim 8, wherein the rigid connector, when viewed from a first perspective, has a T-shaped structure having an upper beam and a lower leg, and wherein the one or more openings of the first side of the recess of the frame has a relatively broader portion and a relatively narrower portion adapted to cooperate with the T-shaped structure of the rigid connector.

10. The LED luminaire of claim 9, wherein the upper beam of the T-shaped structure projects out of the plane of the lower leg to form an acute angle or curved element adapted to serve as a catch element to hold the component chassis in contact with the frame when the component chassis is rotated with respect to the frame such that the one or more second engaging elements are remote from the frame.

11. The LED luminaire of claim 7, wherein the one or more first engaging elements employ mechanical interlocking to connect to the frame through cooperation with the one or more openings of the recess of the frame.

12. The LED luminaire of claim 7, wherein the one or more first engaging elements comprise an acute angle connector.

13. The LED luminaire of claim 7, wherein the one or more second engaging elements are one or more movable engaging elements, and wherein the component chassis comprises opposing channels or grooves for receiving a lens.

14. The LED luminaire of claim 13, wherein the one or more movable engaging elements are selected from the group consisting of a sliding lock, a rotating hinge, a rotating latch, and a spring-loaded catch.

15. The LED luminaire of claim 7, wherein the one or more first engaging elements has a relatively narrow rigid structure attached to the component chassis and a relatively wider catch element attached to the rigid structure remote from the component chassis.

16. A method for treating an LED luminaire, wherein the LED luminaire comprises an LED component chassis comprising a first side and an opposing second side, one or more LED lights, an LED driver, a power receptacle for connecting to a power source, a frame having a recess for receiving the LED component chassis, wherein the recess comprises one or more structures for receiving one or more first engaging elements from a first side of the component chassis and a surface remote from the first edge of the recess adapted to receive one or more second engaging elements to removably secure a second side of the component chassis with one or more second engaging elements, the method comprising disconnecting the one or more second engaging elements of the component chassis from the frame, moving the second side of the component chassis away from the frame after which the one or more first engaging elements remain connected to the frame, and then treating the component chassis.

17. The method of claim 16, wherein the frame is mounted to a ceiling and wherein the component chassis, after its second side has been rotated away from the frame, is suspended from the frame in a substantially vertical orientation.

18. The method of claim 16, wherein disconnecting the one or more second engaging elements of the component chassis from the frame comprises moving one or more movable elements on the one or more second engaging elements.

19. The method of claim 16, wherein the one or more first engaging elements remain secured to the frame by a mechanical interlock when the second edge of the component chassis is rotated away from the frame.

20. The method claim 16, wherein the mechanical interlock comprises a first engaging element having a rigid structure connected to catch element, wherein the catch element is wider than the rigid structure.

* * * * *